(12) United States Patent
Leano et al.

(10) Patent No.: US 10,513,095 B2
(45) Date of Patent: *Dec. 24, 2019

(54) SHRINK FILMS, AND METHOD OF MAKING THEREOF

(71) Applicant: Dow Global Technologies LLC, Midland, MI (US)

(72) Inventors: Mauricio E. Leano, Freeport, TX (US); Paul R. Elowe, Arcadia, CA (US); Mary Anne Leugers, Midland, MI (US); Debkumar Bhattacharjee, Blue Bell, PA (US); Todd O. Pangburn, Midland, MI (US); Bruce Peterson, Parkers Prairie, MN (US); Matthew Toyli, Alexandria, MN (US)

(73) Assignee: Dow Global Technologies LLC, Midland, MI (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/528,632

(22) PCT Filed: Oct. 21, 2015

(86) PCT No.: PCT/US2015/056658
§ 371 (c)(1),
(2) Date: May 22, 2017

(87) PCT Pub. No.: WO2016/089496
PCT Pub. Date: Jun. 9, 2016

(65) Prior Publication Data
US 2017/0259541 A1    Sep. 14, 2017

Related U.S. Application Data

(60) Provisional application No. 62/085,979, filed on Dec. 1, 2014.

(51) Int. Cl.
*B32B 27/08* (2006.01)
*C09B 23/16* (2006.01)
(Continued)

(52) U.S. Cl.
CPC ............... *B32B 27/08* (2013.01); *B32B 7/02* (2013.01); *B32B 7/10* (2013.01); *B32B 7/12* (2013.01);
(Continued)

(58) Field of Classification Search
CPC ......... B32B 27/08; B32B 27/06; B32B 27/32; B32B 2255/10; B32B 2255/26;
(Continued)

(56) References Cited

U.S. PATENT DOCUMENTS 5,399,426 A * 3/1995 Koch ................. B32B 27/32
428/335
6,312,828 B1    11/2001 Akao
(Continued)

FOREIGN PATENT DOCUMENTS

| JP | 2003302905 A | 10/2003 |
| WO | 2010111869 A1 | 10/2010 |
| WO | 2012044291 A1 | 4/2012 |

OTHER PUBLICATIONS

JP2003302905A English translation (Year: 2003).*
(Continued)

*Primary Examiner* — Scott R. Walshon
*Assistant Examiner* — Jasper Saberi

(57) ABSTRACT

A shrink film comprising a polyethylene-based film having a top surface, a bottom surface, and comprising one or more layers, wherein at least one layer of the polyethylene-based film comprises a low density polyethylene having a density of from 0.917 g/cc to 0.935 g/cc and melt index, I2, of from 0.1 g/10 min to 5 g/10 min, a linear low density polyethylene (Continued)

having a density of from 0.900 g/cc to 0.965 g/cc and melt index, I2, of from 0.05 g/10 min to 15 g/10 min, or combinations thereof, and optionally, a medium density polyethylene, a high density polyethylene, or combinations thereof, and a coating layer disposed on the top surface of the polyethylene-based film, wherein the coating layer comprises an adhesive and a near-infrared absorbent material.

8 Claims, 2 Drawing Sheets

(51) Int. Cl.
| | |
|---|---|
| C09B 23/00 | (2006.01) |
| C09B 23/01 | (2006.01) |
| B32B 27/32 | (2006.01) |
| C08J 7/04 | (2006.01) |
| B32B 7/12 | (2006.01) |
| B32B 7/02 | (2019.01) |
| B32B 7/10 | (2006.01) |
| B32B 9/04 | (2006.01) |
| B32B 27/06 | (2006.01) |
| B32B 27/16 | (2006.01) |
| B32B 27/20 | (2006.01) |
| B32B 27/28 | (2006.01) |
| C08L 23/08 | (2006.01) |
| C09B 23/06 | (2006.01) |
| C09B 23/08 | (2006.01) |
| C09B 31/068 | (2006.01) |
| B32B 25/08 | (2006.01) |

(52) U.S. Cl.
CPC .............. *B32B 9/048* (2013.01); *B32B 27/06* (2013.01); *B32B 27/16* (2013.01); *B32B 27/20* (2013.01); *B32B 27/28* (2013.01); *B32B 27/32* (2013.01); *C08J 7/047* (2013.01); *C08L 23/08* (2013.01); *C09B 23/00* (2013.01); *C09B 23/0033* (2013.01); *C09B 23/0066* (2013.01); *C09B 23/06* (2013.01); *C09B 23/083* (2013.01); *C09B 23/086* (2013.01); *C09B 23/166* (2013.01); *C09B 31/068* (2013.01); *B32B 25/08* (2013.01); *B32B 27/327* (2013.01); *B32B 2250/242* (2013.01); *B32B 2250/40* (2013.01); *B32B 2255/10* (2013.01); *B32B 2255/24* (2013.01); *B32B 2255/26* (2013.01); *B32B 2264/108* (2013.01); *B32B 2270/00* (2013.01); *B32B 2307/30* (2013.01); *B32B 2307/40* (2013.01); *B32B 2307/406* (2013.01); *B32B 2307/4026* (2013.01); *B32B 2307/418* (2013.01); *B32B 2307/42* (2013.01); *B32B 2307/51* (2013.01); *B32B 2307/514* (2013.01); *B32B 2307/54* (2013.01); *B32B 2307/558* (2013.01); *B32B 2307/72* (2013.01); *B32B 2307/732* (2013.01); *B32B 2307/736* (2013.01); *B32B 2307/75* (2013.01); *B32B 2439/70* (2013.01); *C08J 2323/06* (2013.01); *C08L 2201/04* (2013.01); *C08L 2201/08* (2013.01)

(58) Field of Classification Search
CPC ........ B32B 2307/40; B32B 2307/4026; B32B 2307/736; C08L 23/06; C08L 23/00; C08J 2323/06; C09B 23/00; C09B 23/0033; C09B 23/0041; C09B 23/0066; C09B 23/166
See application file for complete search history.

(56) References Cited

U.S. PATENT DOCUMENTS

| | | | |
|---|---|---|---|
| 2004/0053022 A1* | 3/2004 | Ohlsson | B65B 53/00 428/213 |
| 2005/0004314 A1 | 1/2005 | Marechal | |
| 2009/0258191 A1 | 10/2009 | Peacock | |
| 2011/0248225 A1 | 10/2011 | Mamak et al. | |
| 2012/0119171 A1* | 5/2012 | Ohashi | C07D 209/08 252/587 |
| 2013/0157463 A1* | 6/2013 | Goldfarb | G02B 5/208 438/689 |

OTHER PUBLICATIONS

JP2003-302905A translation (Year: 2003).*
PCT/US2015/056647, International Search Report & Written Opinion dated Dec. 22, 2015.
PCT/US2015/056647, International Preliminary Report on Patentability dated Jun. 6, 2017.
PCT/US2015/056658, International Search Report and Written Opinion dated Feb. 3, 2016.
PCT/US2015/056658, International Preliminary Report on Patentability dated Jun. 15, 2017.

* cited by examiner

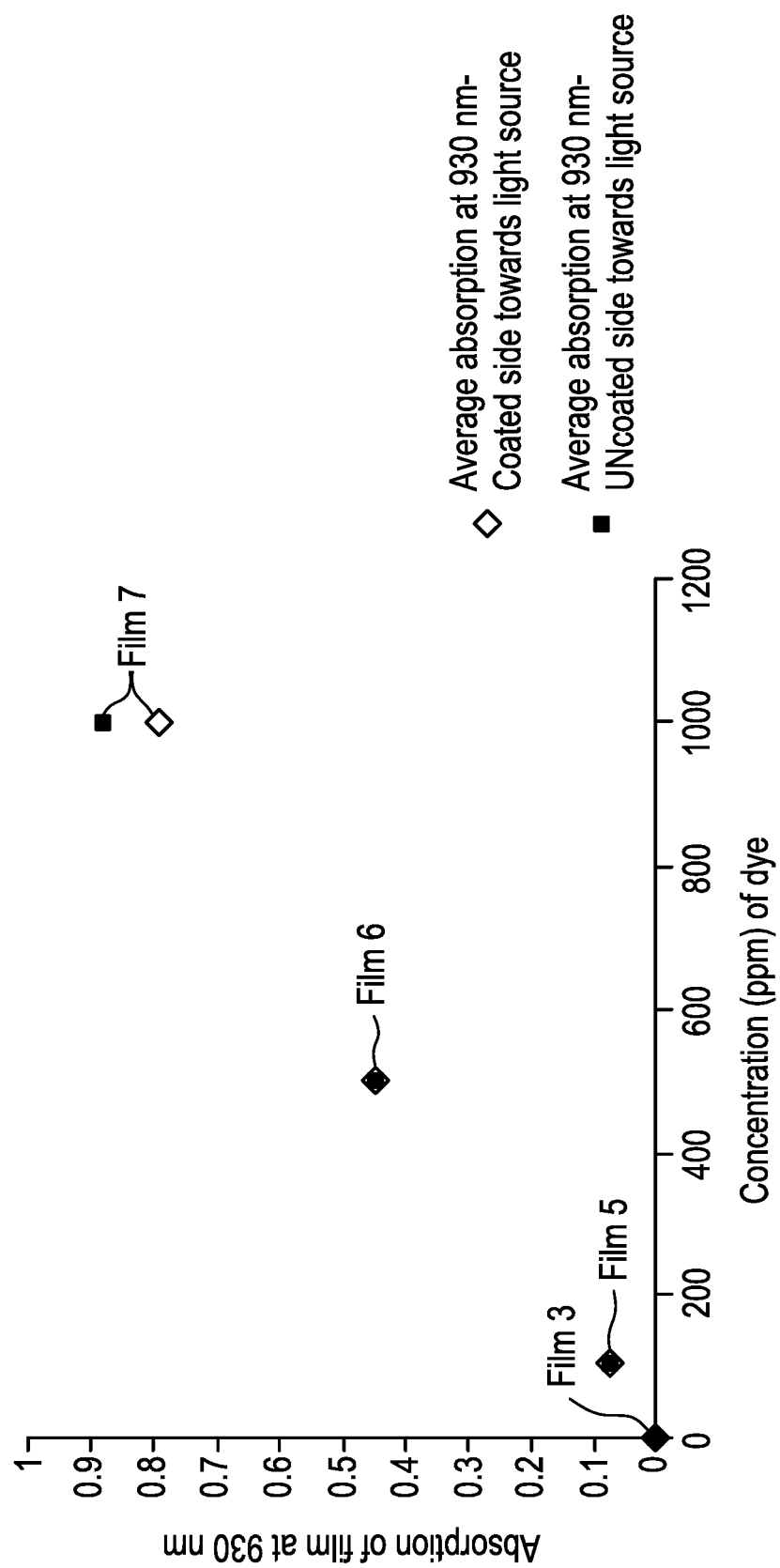

SHRINK FILMS, AND METHOD OF MAKING THEREOF

FIELD

Embodiments of the present disclosure generally relate to polyethylene-based shrink films, and more particularly, to polyethylene-based shrink films having near-infrared radiation absorbing capabilities, and methods of making thereof.

BACKGROUND

The shrink packaging generally involves wrapping an article(s) in a heat shrink film to form a package, and then heat shrinking the film by exposing it to sufficient heat to cause shrinkage and intimate contact between the film and article. The heat can be provided by conventional heat sources, such as heated air. However, conventional heat sources like heated air are generally insulators, and therefore, have a low heat transfer rate. This can result in the very long heated air tunnels in order to generate the necessary levels of heating of the film. In addition, heated air tunnels may also continuously lose heat to the environment. Thus, they can result in a lower heat efficiency.

Accordingly, alternative polyethylene-based shrink films are desired.

SUMMARY

Disclosed in embodiments herein are shrink films. The films comprise a polyethylene-based film having a top surface, a bottom surface, and comprising one or more layers, wherein at least one layer of the polyethylene-based film comprises a low density polyethylene having a density of from 0.917 g/cc to 0.935 g/cc and melt index, I2, of from 0.1 g/10 min to 5 g/10 min, a linear low density polyethylene having a density of from 0.900 g/cc to 0.965 g/cc and melt index, I2, of from 0.05 g/10 min to 15 g/10 min, or combinations thereof, and optionally, a medium density polyethylene, a high density polyethylene, or combinations thereof, and a coating layer disposed on the top surface of the polyethylene-based film, wherein the coating layer comprises an adhesive and a near-infrared absorbent material.

Also disclosed in embodiments herein are methods of making shrink films. The method comprises providing a polyethylene-based film having a top surface, a bottom surface, and comprising one or more layers, wherein at least one layer of the polyethylene-based film comprises a low density polyethylene having a density of from 0.917 g/cc to 0.935 g/cc and melt index, I2, of from 0.1 g/10 min to 5 g/10 min, a linear low density polyethylene having a density of from 0.900 g/cc to 0.965 g/cc and melt index, I2, of from 0.05 g/10 min to 15 g/10 min, or combinations thereof, and optionally, a medium density polyethylene, a high density polyethylene, or combinations thereof; and forming a coating layer on the top surface of the polyethylene-based film, wherein the coating layer comprises an adhesive and a near-infrared absorbent material.

Further disclosed in embodiments herein are multilayer shrink films. The multilayer shrink films comprise a polyethylene-based film having a top surface and a bottom surface, wherein the polyethylene-based film comprises a core layer positioned between a first outer layer and a second outer layer, wherein the core layer comprises a low density polyethylene having a density of from 0.917 g/cc to 0.935 g/cc and melt index, I2, of from 0.1 g/10 min to 5 g/10 min, and optionally, a linear low density polyethylene, a medium density polyethylene, a high density polyethylene, or combinations thereof, and a coating layer disposed on the top surface of the polyethylene-based film, wherein the coating layer comprises an adhesive and a near-infrared absorbent material.

Even further disclosed in embodiments herein are multilayer shrink films. The multilayer shrink films comprise a polyethylene-based film, wherein the polyethylene-based film comprises a core layer positioned between a first outer layer and a second outer layer, wherein the core layer comprises a low density polyethylene having a density of from 0.917 g/cc to 0.935 g/cc and melt index, I2, of from 0.1 g/10 min to 5 g/10 min, and optionally, a linear low density polyethylene, a medium density polyethylene, a high density polyethylene, or combinations thereof, and a coating layer positioned between the first outer layer and the second outer layer, wherein the coating layer comprises an adhesive and a near-infrared absorbent material.

Even further disclosed in embodiments herein are methods of making multilayer shrink films. The method comprises providing a polyethylene-based film having a top surface and a bottom surface, wherein the polyethylene-based film comprises a core layer positioned between a first outer layer and a second outer layer, wherein the core layer comprises a low density polyethylene having a density of from 0.917 g/cc to 0.935 g/cc and melt index, I2, of from 0.1 g/10 min to 5 g/10 min, and optionally, a linear low density polyethylene, a medium density polyethylene, a high density polyethylene, or combinations thereof; and forming a coating layer on the top surface of the polyethylene-based film, wherein the coating layer comprises an adhesive and a near-infrared absorbent material.

Even further disclosed in embodiments herein are methods of making multilayer shrink films. The method comprises providing a polyethylene-based film, wherein the polyethylene-based film comprises a core layer positioned between a first outer layer and a second outer layer, wherein the core layer comprises a low density polyethylene having a density of from 0.917 g/cc to 0.935 g/cc and melt index, I2, of from 0.1 g/10 min to 5 g/10 min, and optionally, a linear low density polyethylene, a medium density polyethylene, a high density polyethylene, or combinations thereof; and positioning a coating layer between the first outer layer and the second outer layer, wherein the coating layer comprises an adhesive and a near-infrared absorbent material.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 2 graphically depicts radiation absorbance at a wavelength of 930 nm for the coated and uncoated side of multilayer polyethylene-based shrink films according to one or more embodiments shown and described herein.

DETAILED DESCRIPTION

Figure 1:
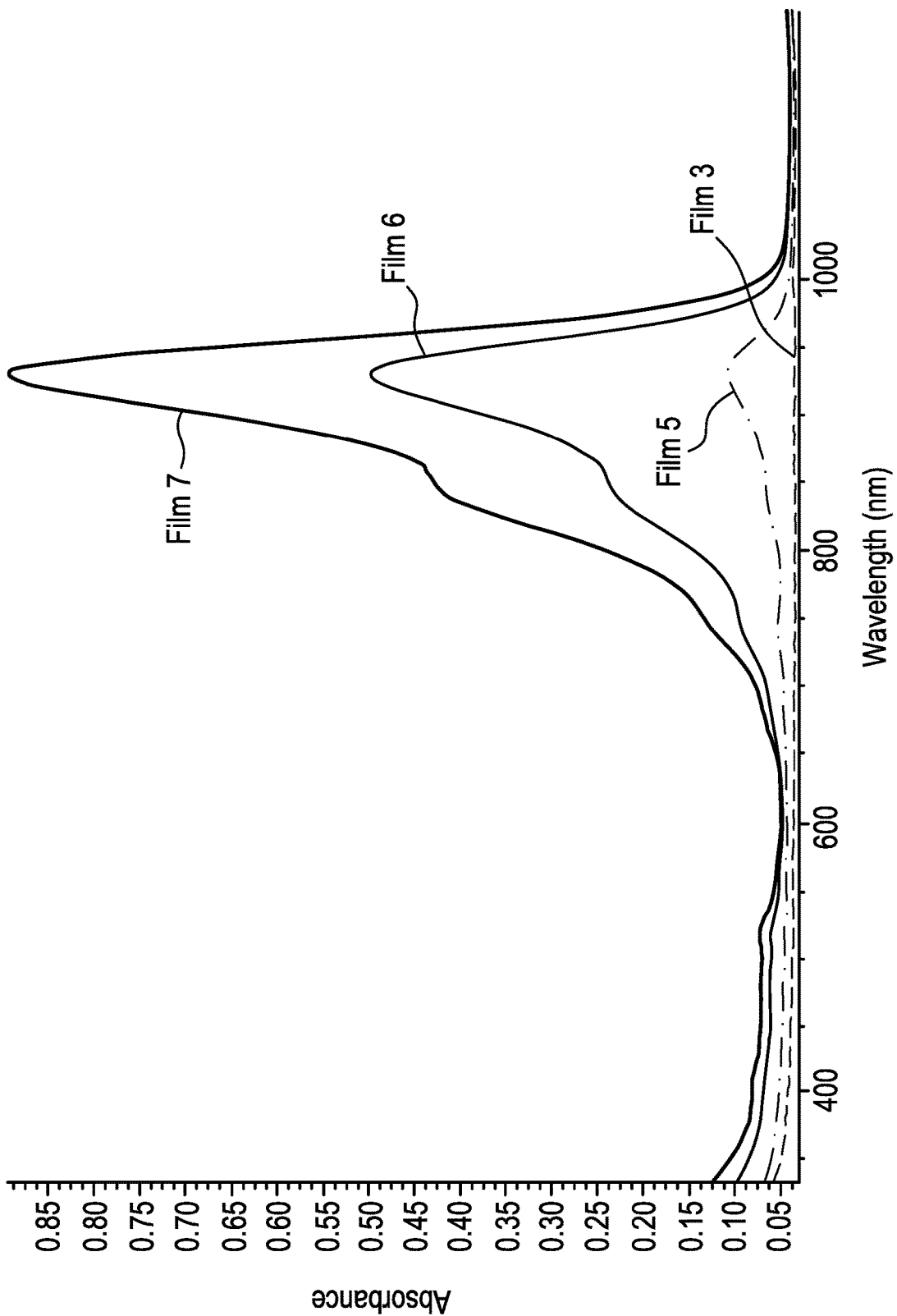
FIG. 1 graphically depicts radiation absorbance for multilayer polyethylene-based shrink films coated with various amounts of a near-infrared absorbent material according to one or more embodiments shown and described herein.

Reference will now be made in detail to embodiments of shrink films, multilayer films, and methods thereof. The shrink films and multilayer shrink films may be used in the packaging of multiple articles. It is noted, however, that this is merely an illustrative implementation of the embodiments disclosed herein. The embodiments are applicable to other technologies that are susceptible to similar problems as those discussed above. For example, the shrink films and multilayer shrink films described herein may be used in other flexible packaging applications, such as, heavy duty shipping sacks, liners, sacks, stand-up pouches, detergent pouches, sachets, etc., all of which are within the purview of the present embodiments.

The shrink films and multilayer shrink films described herein are polyethylene-based or ethylene-based. The term "polyethylene-based" or "ethylene-based," are used interchangeably herein to mean that the film contains greater than 50 wt. %, at least 60 wt. %, at least 70 wt. %, at least 75 wt. %, at least 80 wt. %, at least 85 wt. %, at least 90 wt. %, at least 95 wt. %, at least 99 wt. %, at least 100 wt. %, based on the total polymer weight present in the films, of polyethylene polymers.

In embodiments herein, the shrink films may comprise a polyethylene-based film having a top surface, a bottom surface, and comprising one or more layers, wherein at least one layer of the polyethylene-based film comprises a low density polyethylene, a linear low density polyethylene, or combinations thereof, and a coating layer disposed on the top surface of the polyethylene-based film, wherein the coating layer comprises an adhesive and a near-infrared absorbent material. The polyethylene-based film of the shrink films described herein may further, optionally, comprise a medium density polyethylene, a high density polyethylene, or combinations thereof. In some embodiments, the shrink film is a monolayer shrink film. In other embodiments, the shrink film is a multilayer shrink film.

In embodiments herein, the multilayer shrink films may comprise a polyethylene-based film having a top surface and a bottom surface, wherein the polyethylene-based film comprises a core layer positioned between a first outer layer and a second outer layer, wherein the core layer comprises a low density polyethylene, and a coating layer disposed on the top surface of the polyethylene-based film, wherein the coating layer comprises an adhesive and a near-infrared absorbent material. The polyethylene-based film of the multilayer shrink films described herein may further, optionally, comprise a linear low density polyethylene, a medium density polyethylene, a high density polyethylene, or combinations thereof.

In embodiments herein, the multilayer shrink films may also comprise a polyethylene-based film, wherein the polyethylene-based film comprises a core layer positioned between a first outer layer and a second outer layer, wherein the core layer comprises a low density polyethylene, and a coating layer positioned between the first outer layer and the second outer layer, wherein the coating layer comprises an adhesive and a near-infrared absorbent material. The polyethylene-based film of the multilayer shrink films described herein may further, optionally, comprise a linear low density polyethylene, a medium density polyethylene, a high density polyethylene, or combinations thereof;

In some embodiments, the at least one layer of the polyethylene-based film present in the shrink films and the core layer of the polyethylene-based film present in the multilayer shrink films comprise from 5 to 100 wt. % of the low density polyethylene, based on the total polymer weight present in the at least one layer or the core layer. All individual values and subranges described above are included and disclosed herein. For example, the shrink films and multilayer shrink films may comprise from 5 to 95 wt. %, from 15 to 95 wt. %, from 25 to 95 wt. %, from 35 to 95 wt. %, from 45 to 95 wt. %, from 55 to 95 wt. %, from 65 to 95 wt. %, from 75 to 95 wt. %, or from 80 to 95 wt. %, of the low density polyethylene. In other examples, the shrink films and multilayer shrink films may comprise from 5 to 45 wt. %, from 5 to 40 wt. %, from 5 to 35 wt. %, from 5 to 30 wt. %, from 5 to 25 wt. %, or from 5 to 20 wt. %, of the low density polyethylene.

In other embodiments, the at least one layer of the polyethylene-based film present in the shrink films and the core layer of the polyethylene-based film present in the multilayer shrink films comprises from 5 to 100 wt. % of the linear low density polyethylene, based on the total polymer weight present in the at least one layer or the core layer. All individual values and subranges described above are included and disclosed herein. For example, the shrink films and multilayer shrink films may comprise from 5 to 95 wt. %, from 15 to 95 wt. %, from 25 to 95 wt. %, from 35 to 95 wt. %, from 45 to 95 wt. %, from 55 to 95 wt. %, from 65 to 95 wt. %, from 75 to 95 wt. %, or from 80 to 95 wt. %, of the linear low density polyethylene. In other examples, the shrink films and multilayer shrink films may comprise from 5 to 45 wt. %, from 5 to 40 wt. %, from 5 to 35 wt. %, from 5 to 30 wt. %, from 5 to 25 wt. %, or from 5 to 20 wt. %, of the linear low density polyethylene.

In further embodiments, the at least one layer of the polyethylene-based film present in the shrink films and the core layer of the polyethylene-based film present in the multilayer shrink films comprises 5 to 100 wt. % of the low density polyethylene and from 5 to 100 wt. % of the linear low density polyethylene, based on the total polymer weight present in the at least one layer or the core layer. All individual values and subranges described above are included and disclosed herein. For example, the shrink films and multilayer shrink films may comprise 5 to 50 wt. %, 5 to 45 wt. %, 10 to 45 wt. %, 15 to 45 wt. %, 20 to 45 wt. %, or 25 to 45 wt. % of the low density polyethylene and from 50 to 95 wt. %, 55 to 95 wt. %, 55 to 90 wt. %, 55 to 85 wt. %, 55 to 80 wt. %, or 55 to 75 wt. % of the linear low density polyethylene. In other examples, the shrink films and multilayer shrink films may comprise 50 to 95 wt. %, 55 to 95 wt. %, 60 to 95 wt. %, 65 to 95 wt. %, 70 to 95 wt. %, or 70 to 90 wt. % of the low density polyethylene and from 5 to 50 wt. %, 5 to 45 wt. %, 5 to 40 wt. %, 5 to 35 wt. %, 5 to 30 wt. %, or 10 to 30 wt. % of the linear low density polyethylene.

In some embodiments herein, the at least one layer of the polyethylene-based film present in the shrink films or the core layer of the polyethylene-based film present in the multilayer shrink films may also include LDPE/LDPE blends where one of the LDPE resins has, for example, a relatively higher melt index and the other has, for example, a lower melt index and is more highly branched. The at least one layer of the shrink films and the core layer of the multilayer shrink films may also include LLDPE/LLDPE blends, LDPE/LDPE/LLDPE blends, LLDPE/LLDPE/LDPE blends, as well as other combinations useful in a heat shrinkable film.

Low Density Polyethylene (LDPE)

The low density polyethylene may have a density of from 0.917 g/cc to 0.935 g/cc. All individual values and subranges are included and disclosed herein. For example, in some embodiments, the low density polyethylene may have a density of from 0.917 g/cc to 0.930 g/cc, 0.917 g/cc to 0.925 g/cc, or 0.919 g/cc to 0.925 g/cc. In other embodiments, the low density polyethylene may have a density of from 0.920 g/cc to 0.935 g/cc, 0.922 g/cc to 0.935 g/cc, or 0.925 g/cc to 0.935 g/cc. The low density polyethylene may have a melt index, or I2, of from 0.1 g/10 min to 5 g/10 min. All individual values and subranges are included and disclosed herein. For example, in some embodiments, the low density polyethylene may have a melt index from 0.1 to 4 g/10 min, 0.1 to 3.5 g/10 min, 0.1 to 3 g/10 min, 0.1 g/10 min to 2.5 g/10 min, 0.1 g/10 min to 2 g/10 min, 0.1 g/10 min to 1.5 g/10 min. In other embodiments, the LDPE has a melt index from 0.1 g/10 min to 1.1 g/10 min. In further embodiments, the LDPE has a melt index of 0.2-0.9 g/10 min.

The low density polyethylene may have a melt strength of from 10 cN to 35 cN. All individual values and subranges are included and disclosed herein. For example, in some embodiments, the low density polyethylene may have a melt strength of from 10 cN to 30 cN, from 10 cN to 28 cN, from 10 cN to 25 cN, from 10 cN to 20 cN, or from 10 cN to 18 cN. In other embodiments, the low density polyethylene may have a melt strength of from 12 cN to 30 cN, from 15 cN to 30 cN, from 18 cN to 30 cN, from 20 cN to 30 cN, or from 22 cN to 30 cN. In further embodiments, the low density polyethylene may have a melt strength of from 12 cN to 28 cN, from 12 cN to 25 cN, from 15 cN to 25 cN, from 15 cN to 23 cN, or from 17 cN to 23 cN.

The low density polyethylene may have a molecular weight distribution (MWD or Mw/Mn) of from 5 to 20. All individual values and subranges are included and disclosed herein. For example, in some embodiments, the low density polyethylene may have a MWD of from 5 to 18, from 5 to 15, from 5 to 12, from 5 to 10, or from 5 to 8. In other embodiments, the low density polyethylene may have a MWD of from 8 to 20, from 10 to 20, from 12 to 20, from 15 to 20, or from 17 to 20. In further embodiments, the low density polyethylene may have a MWD of from 8 to 18, from 8 to 15, from 10 to 18, or from 10 to 15. The MWD may be measured according to the triple detector gel permeation chromatography (TDGPC) test method outlined below.

The LDPE may include branched polymers that are partly or entirely homopolymerized or copolymerized in autoclave and/or tubular reactors, or any combination thereof, using any type of reactor or reactor configuration known in the art, at pressures above 14,500 psi (100 MPa) with the use of free-radical initiators, such as peroxides (see for example U.S. Pat. No. 4,599,392, herein incorporated by reference). In some embodiments, the LDPE may be made in an autoclave process under single phase conditions designed to impart high levels of long chain branching, such as described in PCT patent publication WO 2005/023912, the disclosure of which is incorporated herein. Examples of suitable LDPEs may include, but are not limited to, ethylene homopolymers, and high pressure copolymers, including ethylene interpolymerized with, for example, vinyl acetate, ethyl acrylate, butyl acrylate, acrylic acid, methacrylic acid, carbon monoxide, or combinations thereof. The ethylene may also be interpolymerized with an alpha-olefin comonomer, for example, at least one C3-C20 alpha-olefin, such as propylene, isobutylene, 1-butene, 1-pentene, 1-hexene, and mixtures thereof. Exemplary LDPE resins may include, but is not limited to, resins sold by The Dow Chemical Company, such as, LDPE 132I resins, LDPE 621I resins, LDPE 662I resins, or AGILITY™ 1000 and 2001 resins, resins sold by Westlake Chemical Corporation (Houston, Tex.), such as EF412, EF602, EF403, or EF601, resins sold by LyondellBasell Industries (Houston, Tex.), such as, PETROTHENE™ M2520 or NA940, and resins sold by The ExxonMobil Chemical Company (Houston, Tex.) such as, LDPE LD 051.LQ or NEXXSTAR™ LDPE-00328. Other exemplary LDPE resins are described in WO 2014/051682 and WO 2011/019563, which are herein incorporated by reference.

Linear Low Density Polyethylene (LLDPE)

In some embodiments, the linear low density polyethylene has a polymer backbone that may lack measurable or demonstrable long chain branches. As used herein, "long chain branching" means branches having a chain length greater than that of any short chain branches, which are a result of comonomer incorporation. The long chain branch can be about the same length or as long as the length of the polymer backbone. In other embodiments, the linear low density polyethylene may have measurable or demonstrable long chain branches. For example, in some embodiments, the linear low density polyethylene is substituted with an average of from 0.001 long chain branches/10,000 carbons to 3 long chain branches/10,000 carbons, from 0.001 long chain branches/10,000 carbons to 1 long chain branches/10,000 carbons, from 0.05 long chain branches/10,000 carbons to 1 long chain branches/10,000 carbons. In other embodiments, the linear low density polyethylene is substituted with an average of less than 1 long chain branches/10,000 carbons, less than 0.5 long chain branches/10,000 carbons, or less than 0.05 long chain branches/10,000 carbons, or less than 0.01 long chain branches/10,000 carbons. Long chain branching (LCB) can be determined by conventional techniques known in the industry, such as 13C nuclear magnetic resonance (13C NMR) spectroscopy, and can be quantified using, for example, the method of Randall (Rev. Macromol. Chem. Phys., C29 (2 & 3), p. 285-297). Two other methods that may be used include gel permeation chromatography coupled with a low angle laser light scattering detector (GPC-LALLS), and gel permeation chromatography coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin A., Modern Methods of Polymer Characterization, John Wiley & Sons, New York (1991), pp. 103-112.

In some embodiments, the linear low density polyethylene may be a homogeneously branched or heterogeneously branched and/or unimodal or multimodal (e.g., bimodal) polyethylene. As used herein, "unimodal" refers to the MWD in a GPC curve does not substantially exhibit multiple component polymers (i.e., no humps, shoulders or tails exist or are substantially discernible in the GPC curve). In other words, the degree of separation is zero or substantially close to zero. As used herein, "multimodal" refers to the MWD in a GPC curve exhibits two or more component polymers, wherein one component polymer may even exist as a hump, shoulder or tail relative to the MWD of the other component polymer. The linear low density polyethylene comprises ethylene homopolymers, interpolymers of ethylene and at least one comonomer, and blends thereof.

Examples of suitable comonomers may include alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the linear low density polyethylene is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the linear low density polyethylene is an ethylene/alpha-olefin copolymer, wherein the alpha-olefin is selected from the group consisting of propylene, 1-butene, 1-hexene, and 1-octene. In further embodiments, the linear low density polyethylene is an ethylene/alpha-olefin copolymer, wherein the alpha-olefin is selected from the group consisting of 1-hexene and 1-octene. In even further embodiments, the linear low density polyethylene is an ethylene/alpha-olefin copolymer, wherein the alpha-olefin is 1-octene. In even further embodiments, the linear low density polyethylene is a substantially linear ethylene/alpha-olefin copolymer, wherein the alpha-olefin is 1-octene. In some embodiments, the linear low density polyethylene is an ethylene/alpha-olefin copolymer, wherein the alpha-olefin is 1-butene.

In some embodiments, the linear low density polyethylene is an ethylene/alpha-olefin copolymer that may comprise greater than 50%, by weight, of the units derived from ethylene. All individual values and subranges of greater than 50%, by weight, are included and disclosed herein. For example, the linear low density polyethylene is an ethylene/alpha-olefin copolymer that may comprise at least 60%, at least 70%, at least 80%, at least 90%, at least 92%, at least 95%, at least 97%, at least 98%, at least 99%, at least 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene. The linear low density polyethylene is an ethylene/alpha-olefin copolymer that may comprise less than 30%, by weight, of units derived from one or more alpha-olefin comonomers. All individual values and subranges of less than 30%, by weight, are included herein and disclosed herein. For example, the linear low density polyethylene is an ethylene/alpha-olefin copolymer that may comprise less than 25%, less than 20%, less than 18%, less than 15%, less than 12%, less than 10%, less than 8%, less than 5%, less than 4%, less than 3%, from 0.2 to 15%, 0.2 to 12%, 0.2 to 10%, 0.2 to 8%, 0.2 to 5%, 0.2 to 3%, 0.2 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

In some embodiments, the linear low density polyethylene is an ethylene/alpha-olefin copolymer that may comprise at least 90 percent by moles of units derived from ethylene. All individual values and subranges from at least 90 mole percent are included herein and disclosed herein; for example, the linear low density polyethylene is an ethylene/alpha-olefin copolymer that may comprise at least 93 percent, at least 95 percent, at least 96 percent, at least 97 percent, at least 98 percent, at least 99 percent, by moles, of units derived from ethylene; or in the alternative, the linear low density polyethylene is an ethylene/alpha-olefin copolymer that may comprise from 85 to 99.5 percent, from 85 to 99 percent, from 85 to 97 percent, from 85 to 95 percent, from 88 to 99.5 percent, from 88 to 99 percent, from 88 to 97 percent, from 88 to 95 percent, from 90 to 99.5 percent, from 90 to 99 percent, from 90 to 97 percent, from 90 to 95 percent, from 92 to 99.5, from 92 to 99 percent, from 92 to 97 percent, from 95 to 99.5, from 95 to 99 percent, from 97 to 99.5 percent, or from 97 to 99 percent, by moles, of units derived from ethylene. The linear low density polyethylene is an ethylene/alpha-olefin copolymer that may comprise less than 15 percent by moles of units derived from one or more α-olefin comonomers. All individual values and subranges from less than 15 mole percent are included herein and disclosed herein. For example, the linear low density polyethylene is an ethylene/alpha-olefin copolymer that may comprise less than 12 percent, less than 10 percent, less than 8 percent, less than 7 percent, less than 5 percent, less than 4 percent, or less than 3 percent, by moles, of units derived from one or more alpha-olefin comonomers; or in the alternative, the linear low density polyethylene is an ethylene/alpha-olefin copolymer that may comprise from 0.5 to 15 percent, from 0.5 to 12 percent, from 0.5 to 10 percent, 0.5 to 8 percent, 0.5 to 5 percent, 0.5 to 3 percent, 1 to 12 percent, 1 to 10 percent, 1 to 8 percent, 1 to 5 percent, 2 to 12 percent, 2 to 10 percent, 2 to 8 percent, 2 to 5 percent, 3 to 12 percent, 3 to 10 percent, 3 to 7 percent, by moles of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Other examples of suitable linear low density polyethylene include substantially linear ethylene polymers, which are further defined in U.S. Pat. Nos. 5,272,236, 5,278,272, 5,582,923, 5,733,155, and EP2653392, and which are incorporated by reference; homogeneously branched linear ethylene polymer compositions, such as those in U.S. Pat. No. 3,645,992, which is incorporated by reference; heterogeneously branched ethylene polymers, such as those prepared according to the process disclosed in U.S. Pat. No. 4,076,698; and/or blends thereof (such as those disclosed in U.S. Pat. Nos. 3,914,342 or 5,854,045), all of which is incorporated by reference. In some embodiments, the linear low density polyethylene may include ELITE™, ELITE™ AT, ATTANE™, AFFINITY™, FLEXOMER™, or DOWLEX™ resins sold by The Dow Chemical Company, including, for example, ELITE™ 5100G or 5400G resins, ELITE™ AT 6401, ATTANE™ 4201 or 4202 resins, AFFINITY™ 1840, and DOWLEX™ 2020, 2045G, 2049G, or 2685 resins; EXCEED™ or ENABLE™ resins sold by Exxon Mobil Corporation, including, for example, EXCEED™ 1012, 1018 or 1023JA resins, and ENABLE™ 27-03, 27-05, or 35-05 resins; linear low density polyethylene resins sold by Westlake Chemical Corporation, including, for example, LLDPE LF1020 or HIFOR Xtreme™

SC74836 resins; linear low density polyethylene resins sold by LyondellBasell Industries, including, for example, PETROTHENE™ GA501 and LP540200 resins, and ALATHON™ L5005 resin; linear low density polyethylene resins sold by Nova Chemicals Corp., including, for example, SCLAIR™ FP120 and NOVAPOL™ TF-Y534; linear low density polyethylene resins sold by Chevron Phillips Chemical Company, LLC, including, for example, mPACT™ D139 or D350 resins and MARFLEX™ HHM TR-130 resin; linear low density polyethylene resins sold by Borealis AG, including, for example, BORSTAR™ FB 2310 resin.

The linear low density polyethylene can be made via gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. Suitable linear low density polyethylene may be produced according to the processes described at pages 15-17 and 20-22 in WO 2005/111291 A1, which is herein incorporated by reference. The catalysts used to make the linear low density polyethylene described herein may include Ziegler-Natta, chrome, metallocene, constrained geometry, or single site catalysts. In some embodiments, the LLDPE may be a znLLDPE, which refers to linear polyethylene made using Ziegler-Natta catalysts, a uLLDPE or "ultra linear low density polyethylene," which may include linear polyethylenes made using Ziegler-Natta catalysts, or a mLLDPE, which refers to LLDPE made using metallocene or constrained geometry catalyzed polyethylene. In some embodiments, unimodal LLDPE may be prepared using a single stage polymerization, e.g. slurry, solution, or gas phase polymerization. In some embodiments, the unimodal LLDPE may be prepared via solution polymerization. In other embodiments, the unimodal LLDPE may be prepared via slurry polymerization in a slurry tank. In another embodiment, the unimodal LLDPE may be prepared in a loop reactor, for example, in a single stage loop polymerization process. Loop reactor processes are further described in WO/2006/045501 or WO2008104371. Multimodal (e.g. bimodal) polymers can be made by mechanical blending of two or more separately prepared polymer components or prepared in-situ in a multistage polymerization process. Both mechanical blending and preparation in-situ. In some embodiments, a multimodal LLDPE may be prepared in-situ in a multistage, i.e. two or more stage, polymerization or by the use of one or more different polymerization catalysts, including single-, multi- or dual site catalysts, in a one stage polymerization. For example, the multimodal LLDPE is produced in at least two-stage polymerization using the same catalyst, for e.g. a single site or Ziegler-Natta catalyst, as disclosed in U.S. Pat. No. 8,372,931, which is herein incorporated by reference. Thus, for example two solution reactors, two slurry reactors, two gas phase reactors, or any combinations thereof, in any order can be employed, such as disclosed in U.S. Pat. No. 4,352,915 (two slurry reactors), U.S. Pat. No. 5,925,448 (two fluidized bed reactors), and U.S. Pat. No. 6,445,642 (loop reactor followed by a gas phase reactor). However, in other embodiments, the multimodal polymer, e.g. LLDPE, may be made using a slurry polymerization in a loop reactor followed by a gas phase polymerization in a gas phase reactor, as disclosed in EP 2653392 A1, which is herein incorporated by reference.

In embodiments herein, the linear low density polyethylene has a density of 0.900 to 0.965 g/cc. All individual values and subranges from 0.900 to 0.965 g/cc are included and disclosed herein. For example, in some embodiments, the linear low density polyethylene has a density of 0.910 to 0.935 g/cc, 0.910 to 0.930 g/cc, 0.910 to 0.927 g/cc, 0.910 to 0.925 g/cc, or 0.910 to 0.920 g/cc. In other embodiments, the linear low density polyethylene has a density of 0.915 to 0.940 g/cc, 0.915 to 0.935 g/cc, 0.915 to 0.930 g/cc, 0.915 to 0.927 g/cc, or 0.915 to 0.925 g/cc. In further embodiments, the linear low density polyethylene has a density of 0.930 to 0.965 g/cc, or 0.932 to 0.950 g/cc, 0.932 to 0.940 g/cc or 0.932 to 0.938 g/cc. Densities disclosed herein are determined according to ASTM D-792.

In embodiments herein, the linear low density polyethylene has a melt index, or I2, of 0.05 g/10 min to 15 g/10 min. All individual values and subranges from 0.05 g/10 min to 15 g/10 min are included and disclosed herein. For example, in some embodiments, the linear low density polyethylene has a melt index of 0.05 g/10 min to 10 g/10 min, 0.05 g/10 min to 5 g/10 min, 0.1 g/10 min to 3 g/10 min, 0.1 g/10 min to 2 g/10 min, 0.1 g/10 min to 1.5 g/10 min, or 0.1 g/10 min to 1.2 g/10 min. In other embodiments, the linear low density polyethylene has a melt index of 0.2 g/10 min to 15 g/10 min, 0.2 g/10 min to 10 g/10 min, 0.2 g/10 min to 5 g/10 min, 0.2 g/10 min to 3 g/10 min, 0.2 g/10 min to 2 g/10 min, 0.2 g/10 min to 1.5 g/10 min, or 0.2 g/10 min to 1.2 g/10 min. Melt index, or I2, is determined according to ASTM D1238 at 190° C., 2.16 kg.

In some embodiments, the linear low density polyethylene may have a melt index ratio, I10/I2, of from 6 to 20. All individual values and subranges are included and disclosed herein. For example, the linear low density polyethylene may have a melt index ratio, I10/I2, of from 7 to 20, from 9 to 20, from 10 to 20, from 12 to 20, or from 15 to 20. In other embodiments, the linear low density polyethylene may have a melt index ratio, I10/I2, of less than 20, less than 15, less than 12, less than 10, or less than 8. In further embodiments, the linear low density polyethylene may have a melt index ratio, I10/I2, of from 6 to 18, from 6 to 16, from 6 to 15, from 6 to 12, or from 6 to 10. In even further embodiments, the linear low density polyethylene may have a melt index ratio, I10/I2, of from 7 to 18, from 7 to 16, from 8 to 15, from 8 to 14, or from 10 to 14.

In some embodiments, the linear low density polyethylene may have a melt index ratio, I21/I2, of from 20 to 80. All individual values and subranges are included and disclosed herein. For example, the linear low density polyethylene may have a melt index ratio, I21/I2, of from 20 to 75, 20 to 70, 20 to 65, 20 to 60, 20 to 55, 20 to 50, 25 to 75, 25 to 70, 25 to 65, 25 to 60, 25 to 55, 25 to 50, 30 to 80, 30 to75, 30 to 70, 30 to 65, 30 to, 60, 30 to 55, 30 to 50, 35 to 80, 35 to 75, 35 to 70, 35 to 65, 35 to 60, or 35 to 55 g/10 min. In other embodiments, the linear low density polyethylene may have a melt index ratio, I21/I2, of less than 50, less than 47, less than 45, less than 42, less than 40, less than 35, less than 30. In further embodiments, the linear low density polyethylene may have a melt index ratio, I21/I2, of 20 to 40, 20 to 37, 22 to 37, 22 to 35, 25 to 35, or 25 to 30.

In some embodiments, the linear low density polyethylene may have an Mw/Mn ratio of less than 10.0. All individual values and subranges are included and disclosed herein. For example, the linear low density polyethylene may have an Mw/Mn ratio of less than 9.0, less than 7.0, less than 6.0, less than 5.5, less than 5.0, less than 4.5, less than 4.0, or less than 3.8. In other embodiments, the linear low density polyethylene may have an Mw/Mn ratio of from 2.0 to 10.0, from 2.0 to 8.0, from 2.0 to 6.0, 2.0 to 5.5, 2.0 to 5.0, 2.0 to 4.5, 2.0 to 4.0, 2.2 to 6.0, 2.2 to 5.5, 2.2 to 5.0, 2.2 to 4.5, 2.2 to 4.0, 2.5 to 6.0, 2.5 to 5.5, 2.5 to 5.0, 2.5 to 4.5, or 2.5 to 4.0. In further embodiments, the linear low density polyethylene may have an Mw/Mn ratio of from 3.0 to 5.5, 3.0 to 4.5, 3.0 to 4.0, 3.2 to 5.5, 3.2 to 5, or 3.2 to 4.5. The Mw/Mn ratio may be determined by conventional gel permeation chromatography (GPC) as outlined below.

In some embodiments, the linear low density polyethylene may have an Mz/Mw ratio of 1.5 to 6.0. All individual values and subranges are included and disclosed herein. The linear low density polyethylene can range from a lower limit of 1.5, 1.75, 2.0, 2.5, 2.75, 3.0, or 3.5 to an upper limit of 1.65, 1.85, 2.0, 2.55, 2.90, 3.34, 3.79, 4.0, 4.3, 4.5, 5.0, 5.25, 5.5, 5.8, 6.0. For example, in some embodiments, the linear low density polyethylene may have an Mz/Mw ratio of 1.5 to 5.5, 1.5 to 5.0, 1.5 to 4.0, 1.5 to 3.5, 1.5 to 3.0, or from 1.5 to 2.5.

Optional Polymers

In embodiments herein, the at least one layer of the polyethylene-based film present in the shrink films and the core layer of the polyethylene-based film present in the multilayer shrink films may, optionally, comprise a medium density polyethylene (MDPE), a high density polyethylene (HDPE), or combinations thereof. In some embodiments, the at least one layer of the polyethylene-based film present in the shrink films and the core layer of the polyethylene-based film present in the multilayer shrink films may comprise from 5 to 100%, by weight of the polymer composition, of MDPE. All individual values and subranges from 5 to 100% are included and disclosed herein. For example, in some embodiments, the shrink films or multilayer shrink films may comprise from 25 to 100%, 30 to 100%, 35 to 90%, 40 to 85%, 40 to 80%, by weight of the polymer composition, of MDPE. In other embodiments, the shrink films or multilayer shrink films may further comprise from 1 to 30%, 1 to 20%, 1 to 15%, 1 to 10%, by weight of the polymer composition, of MDPE. In further embodiments, the shrink films or multilayer shrink films may further comprise from 5 to 10%, by weight of the polymer composition, of MDPE.

In some embodiments, the at least one layer of the polyethylene-based film present in the shrink films and the core layer of the polyethylene-based film present in the multilayer shrink films may comprise from 5 to 100%, by weight of the polymer composition, of HDPE. All individual values and subranges from 5 to 100% are included and disclosed herein. For example, in some embodiments, the shrink films or multilayer shrink films may comprise from 25 to 100%, 30 to 100%, 35 to 90%, 40 to 85%, 40 to 80%, by weight of the polymer composition, of HDPE. In other embodiments, the shrink films or multilayer shrink films may further comprise from 1 to 30%, 1 to 20%, 1 to 15%, 1 to 10%, by weight of the polymer composition, of HDPE. In further embodiments, the shrink films or multilayer shrink films may further comprise from 5 to 10%, by weight of the polymer composition, of HDPE.

In some embodiments, the at least one layer of the polyethylene-based film present in the shrink films and the core layer of the polyethylene-based film present in the multilayer shrink films may comprise no more than 50%, by weight of the polymer composition, of a medium density polyethylene (MDPE), a high density polyethylene (HDPE), or combinations thereof. In other embodiments, the at least one layer of the polyethylene-based film present in the shrink films and the core layer of the polyethylene-based film present in the multilayer shrink films may comprise no more than 40%, by weight of the polymer composition, of a medium density polyethylene (MDPE), a high density polyethylene (HDPE), or combinations thereof.

The MDPE may be an ethylene homopolymer or copolymers of ethylene and alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the MDPE is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the MDPE is an ethylene/alpha-olefin copolymer, wherein the alpha-olefin is selected from the group consisting of propylene, 1-butene, 1-hexene, and 1-octene.

The MDPE may have a density of from 0.923 g/cc and 0.935 g/cc. All individual values and subranges are included and disclosed herein. For example, in some embodiments, the MDPE may have a density of from 0.923 g/cc to 0.934 g/cc, 0.923 g/cc to 0.932 g/cc, or 0.923 g/cc to 0.930 g/cc. In other embodiments, the MDPE may have a density of from 0.925 g/cc to 0.935 g/cc, 0.928 g/cc to 0.935 g/cc, or 0.929 g/cc to 0.935 g/cc. The MDPE may have a melt index, or I2, of from 0.05 g/10 min to 5 g/10 min. All individual values and subranges are included and disclosed herein. For example, in some embodiments, the MDPE may have a melt index from 0.05 g/10 min to 2.5 g/10 min, 0.05 g/10 min to 2 g/10 min, 0.05 g/10 min to 1.5 g/10 min. In other embodiments, the MDPE has a melt index from 0.05 g/10 min to 1.1 g/10 min. In further embodiments, the MDPE has a melt index of 0.1-0.9 g/10 min.

In some embodiments, the MDPE may have a molecular weight distribution (MWD) of 2.0 to 8.0. All individual values and subranges are included and disclosed herein. For example, in some embodiments, the MDPE may have a MWD of 2.0 to 7.5, 2.0 to 7.0, 2.0 to 6.5, 2.0 to 6.0, 2.0 to 5.5, 2.0 to 5.0, 2.0 to 4.5, 2.0 to 4.0, 2.0 to 3.8, 2.0 to 3.6, 2.0 to 3.4, 2.0 to 3.2, or 2.0 to 3.0. In other embodiments, the MDPE may have a MWD of 2.2 to 4.0, 2.4 to 4.0, 2.6 to 4.0, 2.8 to 4.0, or 3.0 to 4.0. In further embodiments, the MDPE may have a MWD of 3.0 to 8.0, 3.5 to 8.0, 3.5 to 7.5, 3.5 to 7.0, 4.0 to 7.0, or 4.0 to 6.5.

The MDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the MDPE is made in the solution process operating in either parallel or series dual reactor mode. The MDPE may also be made by a high pressure, free-radical polymerization process. Methods for preparing MDPE by high pressure, free radical polymerization can be found in U.S. 2004/0054097, which is herein incorporated by reference, and can be carried out in an autoclave or tubular reactor as well as any combination thereof. The catalysts used to make the MDPE described herein may include Ziegler-Natta, metallocene, constrained geometry, single site catalysts, or chromium-based catalysts. Exemplary suitable MDPE resins may include resins sold by The Dow Chemical Company, such as, DOWLEX™ 2038.68G or DOWLEX™ 2042G, resins sold by LyondellBasell Industries (Houston, Tex.), such as, PETROTHENE™ L3035, ENABLE™ resins sold by The ExxonMobil Chemical Company (Houston, Tex.), resins sold by Chevron Phillips Chemical Company LP, such as, MARFLEX™ TR-130, and resins sold by Total Petrochemicals & Refining USA Inc., such as HF 513, HT 514, and HR 515. Other exemplary MDPE resins are described in U.S. 2014/0255674, which is herein incorporated by reference.

The HDPE may also be an ethylene homopolymer or copolymers of ethylene and alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the HDPE is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the HDPE is an ethylene/alpha-olefin copolymer, wherein the alpha-olefin is selected from the group consisting of propylene, 1-butene, 1-hexene, and 1-octene. The amount of comonomer used will depend upon the desired density of the HDPE polymer and the specific comonomers selected, taking into account processing conditions, such as temperature and pressure, and other factors such as the presence or absence of telomers and the like, as would be apparent to one of ordinary skill in the art in possession of the present disclosure.

The HDPE may have a density of from 0.935 g/cc and 0.975 g/cc. All individual values and subranges are included and disclosed herein. For example, in some embodiments, the HDPE may have a density of from 0.940 g/cc to 0.975 g/cc, 0.940 g/cc to 0.970 g/cc, or 0.940 g/cc to 0.965 g/cc. In other embodiments, the HDPE may have a density of from 0.945 g/cc to 0.975 g/cc, 0.945 g/cc to 0.970 g/cc, or 0.945 g/cc to 0.965 g/cc. In further embodiments, the HDPE may have a density of from 0.947 g/cc to 0.975 g/cc, 0.947 g/cc to 0.970 g/cc, 0.947 g/cc to 0.965 g/cc, 0.947 g/cc to 0.962 g/cc, or 0.950 g/cc to 0.962 g/cc. The HDPE may have a melt index, or I2, of from 0.01 g/10 min to 100 g/10 min. All individual values and subranges are included and disclosed herein. For example, in some embodiments, the HDPE may have a melt index from 0.01 g/10 min to 5 g/10 min, 0.01 g/10 min to 4 g/10 min, 0.01 g/10 min to 3.5 g/10 min, 0.01 g/10 min to 3 g/10 min, 0.01 g/10 min to 2.5 g/10 min, 0.01 g/10 min to 2 g/10 min, 0.01 g/10 min to 1.5 g/10 min, 0.01 g/10 min to 1.25 g/10 min, or 0.01 g/10 min to 1 g/10 min. In other embodiments, the HDPE has a melt index from 0.05 g/10 min to 5 g/10 min, 0.1 g/10 min to 5 g/10 min, 1.0 g/10 min to 10 g/10 min, 1.0 g/10 min to 8 g/10 min, 1.0 g/10 min to 7 g/10 min, or 1.0 g/10 min to 5 g/10 min. In further embodiments, the HDPE has a melt index of 0.3-1.0 g/10 min.

The HDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the HDPE is made in the solution process operating in either parallel or series dual reactor mode. The catalysts used to make the HDPE described herein may include Ziegler-Natta, metallocene, constrained geometry, single site catalysts, or chromium-based catalysts. The HDPE can be unimodal, bimodal, and multimodal. Exemplary HDPE resins that are commercially available include, for instance, ELITE™ 5940G, ELITE™ 5960G, HDPE 35454L, HDPE 82054, HDPE DGDA-2484 NT, DGDA-2485 NT, DGDA-5004 NT, DGDB-2480 NT resins available from The Dow Chemical Company (Midland, Mich.), L5885 and M6020 HDPE resins from Equistar Chemicals, LP, ALATHON™ L5005 from LyondellBasell Industries (Houston, Tex.), and MARFLEX™ HDPE HHM TR-130 from Chevron Phillips Chemical Company LP. Other exemplary HDPE resins are described in U.S. Pat. No. 7,812,094, which is herein incorporated by reference.

Coating Layer—Adhesives

In embodiments herein, the coating layer comprises an adhesive, and may include any adhesives suitable for containing the NIR absorbent materials within the adhesive, and which can be coated onto a surface of one or more layers present in polyethylene-based shrink films. The adhesives may have a high radiation transmittance over at least a portion of the near infrared spectral region of from 700 nm to 3000 nm, and may exhibit low haze. In some embodiments, the adhesives may have greater than 90% transmittance of radiation in the near infrared spectral region and haze values of 5% or less.

Examples of suitable adhesives may include polyurethane adhesives, vinyl acetate adhesives, acrylic acid-based adhesives, polyolefin plastomers and elastomer, rubber (such as, styrene/butadiene rubber, nitrile/butadiene rubber, thermoplastic rubber, natural rubber, ethylene/propylene/diene rubber), and other thermosettable plastics (such as, epoxy, thermosetting silicone, polycarbonates ("PC"), acrylonitrile-butadiene-styrene ("ABS"), high impact polystyrene ("HIPS"), polyester, polyacetyl, thermoplastic polyurethanes ("TPU"), nylon, ionomer (e.g., SURLYN™ ionomer resins), polyvinyl chloride ("PVC")), and blends of two or more of these thermoplastics and/or thermosets such as PC and ABS.

In some embodiments, the adhesive could be based on polyurethane, acrylic acid-based, epoxy, or polyolefin elastomer chemistry and be delivered in solvent, e.g. water, or as 100% solids (often referred to as a solventless system). Examples of suitable polyurethanes include polyurethanes that contain as their structural components, at least one diol and/or polyol component, and/or at least one di- and/or polyisocyanate component, and/or at least one component including at least one hydrophilizing group, and/or optionally mono-, di- and/or triamine-functional and/or hydroxylamine-functional compounds, and/or optionally, other isocyanate-reactive compounds.

Suitable diol- and/or polyol components may include compounds having at least two hydrogen atoms which are reactive with isocyanates. Specific examples include polyether polyols, polyester polyols, polycarbonate polyols, polylactone polyols, and polyamide polyols. In some embodiments, the polyols have 2 to 4 hydroxyl groups, 2 to 3, hydroxyl groups, or simply 2 hydroxyl groups. Of course, mixtures of such compounds are also possible.

Examples of suitable di- and/or polyisocyanate components may include organic compounds that have at least two free isocyanate groups in each molecule. For example, diisocyanates Y(NCO)$_2$, wherein Y represents a divalent aliphatic hydrocarbon radical having 4 to 12 carbon atoms, a divalent cycloaliphatic hydrocarbon radical having 6 to 15 carbon atoms, a divalent aromatic carbon radical having 6 to 15 carbon atoms or a divalent araliphatic hydrocarbon radical having 7 to 15 carbon atoms. Specific examples may include tetramethylene diisocyanate, methylpentamethylene diisocyanate, hexamethylene diisocyanate, dodecamethylene diisocyanate, 1,4-diisocyanato-cyclohexane, 1-isocyanato-3,3,5-trimethyl-5-isocyanatomethyl-cyclohexane (also known as isophorone diisocyanate or IPDI), 4,4'-diisocyanato-dicyclohexyl-methane, 4,4'-diisocyanato-dicyclohexylpropane-(2,2), 1,4-diisocyanatobenzene, 2,4-diisocyanatotoluene, 2,6-diisocyanatotoluene, 4,4'-diisocyanato-diphenylmethane, 2,2'- and 2,4'-diisocyanato-diphenylmethane, tetramethyl xylylene diisocyanate, p-xylylene diisocyanate, p-isopropylidene diisocyanate, and mixtures of these compounds. Example polyisocyanates include compounds that contain hetero atoms in the radical linking the isocyanate groups and/or have a functionality of more than 2 isocyanate groups in each molecule. The first are for example polyisocyanates which are obtained by modifying simple aliphatic, cycloaliphatic, araliphatic and/or aromatic diisocyanates and which comprise at least two diisocyanates with a uretdione, isocyanurate, urethane, allophanate, biuret, carbodiimide, iminooxadiazinedione and/or oxadiazinetrione structure. As an example of a non-modified polyisocyanate having more than 2 isocyanate groups in each molecule there may for example be mentioned 4-isocyanatomethyl-1,8-octane diisocyanate (nonane triisocyanate).

Examples of suitable components including at least one hydrophilizing group may include components containing sulfonate or carboxylate groups, such as diamine compounds or dihydroxyl compounds which additionally contain sulfonate and/or carboxylate groups, such as the sodium, lithium, potassium, tert.-amine salts of N-(2-aminoethyl)-2-aminoethane sulfonic acid, N-(3-aminopropyl)-2-aminoethane sulfonic acid, N-(3-aminopropyl)-3-aminopropane sulfonic acid, N-(2-aminoethyl)-3-aminopropane sulfonic acid, analogous carboxylic acids, dimethylol propionic acid, or dimethylol butyric acid. The acids may be used in their salt form as a sulfonate or carboxylate. Other suitable components including at least one hydrophilizing group may include mono- or difunctional polyethers, which have a non-ionic hydophilizing action and are based on ethylene oxide polymers or ethylene oxide/propylene oxide copolymers that are started on alcohols or amines, such as, for example, CARBOWAX™ methoxypolyethylene glycol (MPEG) 750, available from The Dow Chemical Company. These may be particularly useful if water-based polyurethane or polyurethane dispersions are utilized to disperse the NIR absorbent material.

Examples of suitable mono-, di-, trifunctional amines and/or mono-, di-, trifunctional hydroxylamines may include aliphatic and/or alicyclic primary and/or secondary monoamines, such as ethylamine, diethylamine, isomeric propyl and butyl amines, higher linear aliphatic monoamines and cycloaliphatic monoamines, such as cyclohexylamine. Other examples may include amino alcohols (compounds which contain amino and hydroxyl groups in one molecule), such as, ethanolamine, N-methyl ethanolamine, diethanolamine, diisopropanolamine, 1,3-diamino-2-propanol, N-(2-hydroxyethyl)-ethylene diamine, N,N-bis(2-hydroxyethyl)-ethylene diamine and 2-propanolamine. Further examples may include diamines and triamines, such as 1,2-ethane diamine, 1,6-hexamethylene diamine, 1-amino-3,3,5-trimethyl-5-aminomethyl cyclohexane (isophorone diamine), piperazine, 1,4-diamino cyclohexane, bis-(4-aminocyclohexyl)-methane and diethylene triamine.

Examples of suitable isocyanate-reactive compounds may include aliphatic, cycloaliphatic or aromatic monoalcohols having 2 to 22 C atoms, such as ethanol, butanol, hexanol, cyclohexanol, isobutanol, benzyl alcohol, stearyl alcohol, 2-ethyl ethanol, cyclohexanol, and blocking agents, such as, butanone oxime, dimethylpyrazole, caprolactam, malonic esters, triazole, dimethyl triazole, tert.-butyl-benzyl amine, and cyclopentanone carboxyethyl ester.

In some embodiments, the adhesive is a one component polyurethane adhesive, either as 100% solids or as a dispersion in water, such as those described in U.S. Pat. Nos. 4,687,533, 4,873,307, 4,898,919, 6,133,398, 6,630,050, 6,709,539, and WO1998/058003, which are incorporated herein by reference. Examples of suitable one component polyurethane adhesives may include, but are not limited to, isocyanate- or silane-terminated moisture cure polyurethane prepolymers as 100% solids. Other examples of one component polyurethane adhesives may include polyurethane, acrylic, polyethylene, ethyl vinyl acetate, or vinyl acetate as a dispersion in, for example, water or other suitable solvent. The one component polyurethane adhesive dispersion may comprise, for e.g., 25 to 65% solids (of course, other % solids amounts in a dispersion may be used). These dispersions can optionally be cured with a cross-linker, which are well known in the art. Commercial examples of suitable one component polyurethane adhesives may include ADCOTE™ 89R3 or 331, available from The Dow Chemical Company (Midland, Mich.).

In other embodiments, the adhesive is a two component polyurethane adhesive, wherein the first component comprises an isocyanate terminated prepolymer, and the second component comprises an isocyanate reactive species with active hydrogen (i.e., the H atom is attached to a O, N, or S atom), such as, polyester polyols (aliphatic or aromatic), polyether polyols (aliphatic or aromatic), or blends thereof are used. The isocyanate terminated prepolymer may be produced by the reaction of excess monomeric or polymeric isocyanate (aliphatic, aromatic, or blends thereof) with polyether polyol (aliphatic or aromatic), polyester polyol (aliphatic or aromatic), or a mixture thereof. The components may be selected to provide the desired end use properties. Details of additional 2-component polyurethane adhesives, including their desired end use properties, may be found in U.S. Pat. Nos. 5,603,798, 8,410,213, and WO/2006/042305, which are herein incorporated by reference. Commercial examples of suitable two component polyurethane adhesives may include, for example, ADCOTE™ 545-75EA+Catalyst F, 301A+350A, 811A+Catalyst 811B (or Catalyst F), 545-80+Catalyst F (or F-854), 1640+Coreactant F, or 3307+CR 820 (or CR 857).

In some particular embodiments, the adhesive is a two component polyurethane formulation based on hydroxyl-terminated isocyanate prepolymer and a isocyanate terminated reactive species. Additional two component polyurethane adhesives are described in U.S. Pat. Nos. 7,232,859, 7,928,161, 8,598,297 and 8,821,983, which is herein incorporated by reference.

In some embodiments, the adhesive may be an epoxy adhesive. Examples of suitable epoxy adhesives may include those that comprise at least one epoxy resin and at least one amine compound. The amine compound may have one or more primary and/or secondary amino groups that may be chosen from aliphatic or cycloaliphatic di- or polyamines and polyimines. Suitable epoxy adhesives are described in U.S. Pat. Nos. 4,916,187, 5,629,380, 6,577,971, 6,248,204, 8,618,204, and WO/2006/093949, all of which are herein incorporated by reference.

In some embodiments, the adhesive may be an acrylic polymer. As used herein, "acrylic polymer" refers to polymers having greater than 50% of the polymerized units derived from acrylic monomers. Acrylic resins and emulsions containing acrylic resins are generally known in the art, and reference may be had to The Kirk-Othmer, Encyclopedia of Chemical Technology, Volume 1, John Wiley & Sons, Pages 314-343, (1991), ISBN 0-471-52669-X (v. 1).

Examples of suitable monomers that can be used to form acrylic resins may include alkyl methacrylates having 1-12 carbon atoms, such as, methyl methacrylate, ethyl methacrylate, butyl methacrylate, hexyl methacrylate, 2-ethylhexyl methacrylate, nonyl methacrylate, lauryl methacrylate, cyclohexyl methacrylate, isodecyl methacrylate, propyl methacrylate, phenyl methacrylate, and isobornyl methacrylate; alkyl acrylates having 1-12 carbon atoms in the alkyl group, such as, methyl acrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, cyclohexyl acrylate, isodecyl acrylate, phenyl acrylate, and isobornyl acrylate; styrene; alkyl substituted styrene, such as, α-methyl styrene, t-butyl styrene, vinyl toluene, acrylic acid, and methacrylic acid. Examples of suitable acrylic polymers may include ROBOND™ PS-90, ROBOND™ PS-2000, ROBOND™ PS-7860, ROBOND™ DF-9850, all of which are available from The Dow Chemical Company, or ACRONAL™ V-215, available from BASF Corporation.

In some embodiments, the adhesive may comprise an acrylic polymer suspended in one or more carriers. The adhesive may contain 25-90 percent of one or more carriers based on the total weight of the adhesive, in order to deliver the acrylic resin through a coating method. The carriers may include but are not limited to water or solvents, such as, ethyl acetate, toluene, and methyl ethyl ketone.

In some embodiments, the adhesive may comprise an acrylic polymer emulsified with one or more suitable surfactants in percentages from 0.1-6.0%, based on acrylic monomer. Examples of suitable surfactants may include, but are not limited to, ethoxylated alcohols; sulfonated, sulfated and phosphated alkyl, aralkyl and alkaryl anionic surfactants; alkyl succinates; alkyl sulfosuccinates; and N-alkyl sarcosinates. Representative surfactants are the sodium, potassium, magnesium, ammonium, and the mono-, di- and triethanolamine salts of alkyl and aralkyl sulfates, as well as the salts of alkaryl sulfonates. The alkyl groups of the surfactants may have a total of from about twelve to twenty-one carbon atoms, may be unsaturated, and, in some embodiments, are fatty alkyl groups. The sulfates may be sulfate ethers containing one to fifty ethylene oxide or propylene oxide units per molecule. In some embodiments, the sulfate ethers contain two to three ethylene oxide units. Other representative surfactants may include sodium lauryl sulfate, sodium lauryl ether sulfate, ammonium lauryl sulfate, triethanolamine lauryl sulfate, sodium $C_{14-16}$ olefin sulfonate, ammonium pareth-25 sulfate, sodium myristyl ether sulfate, ammonium lauryl ether sulfate, disodium monooleamidosulfosuccinate, ammonium lauryl sulfosuccinate, sodium dodecylbenzene sulfonate, sodium dioctyl sulfosucciniate, triethanolamine dodecylbenzene sulfonate, and sodium N-lauroyl sarcosinate.

Further examples of suitable surfactants may include the TERGITOL™ surfactants from The Dow Chemical Company, Midland, Mich.; SPAN™ 20, a nonionic surfactant, from Croda International, Snaith, East Riding of Yorkshire, UK., for Sorbitan Monolaurate; ARLATONE™ T, a nonionic surfactant, from Croda International, Snaith, East Riding of Yorkshire, UK., for polyoxyethylene 40 sorbitol septaoleate, i.e., PEG-40 Sorbitol Septaoleate; TWEEN™ 28, a nonionic surfactant, from Croda International, Snaith, East Riding of Yorkshire, UK., for polyoxyethylene 80 sorbitan laurate, i.e., PEG-80 Sorbitan Laurate; products sold under the tradenames or trademarks such as EMCOL™ and WITCONATE™ by AkzoNobel, Amsterdam, The Netherlands; MARLON™ by Sasol, Hamburg Germany; AEROSOL™ by Cytec Industries Inc, Woodland Park, N.J.; HAMPOSYL™ The Dow Chemical Company, Midland, Mich.; and sulfates of ethoxylated alcohols sold under the tradename STANDAPOL™ by BASF.

In embodiments herein, the adhesive may be a polyolefin adhesive. In some embodiments, the adhesive is a polypropylene-based elastomer adhesive, such as, polypropylene-based elastomer adhesives described in U.S. Pat. No. 8,536,268, which is herein incorporated by reference. In some embodiments, the adhesive is a polyethylene-based adhesive. In other embodiments, the adhesive is a polyethylene-based elastomer adhesive.

In some particular embodiments, the polyethylene-based elastomer adhesive may comprise an adhesive composition comprising an ethylene/α-olefin block copolymer, a tackifier, and, optionally, an oil. Additional information may be found in WO/2013/148041 and WO/2014/172179, which are incorporated herein by reference. As used herein, "composition" includes material(s) which comprise the composition, as well as reaction products and decomposition products formed from the materials of the composition. As used herein, the terms "ethylene/α-olefin block copolymer," "olefin block copolymer," or "OBC," mean an ethylene/α-olefin multi-block copolymer, and includes ethylene and one or more copolymerizable α-olefin comonomer in polymerized form, characterized by multiple blocks or segments of two or more polymerized monomer units, differing in chemical or physical properties. The terms "interpolymer" and "copolymer" may be used interchangeably, herein, for the term ethylene/α-olefin block copolymer, and similar terms discussed in this paragraph.

Coating Layer—Near-Infrared (NIR) Absorbent Material

The near infrared absorbent material includes organic or inorganic materials that absorb radiation at wavelengths of from 700 nm to 3000 nm. The near infrared absorbent material may have at least 3% absorption (97% transmittance) within the 700 nm to 3000 nm. In some embodiments, the near infrared absorbent material may have at least 5% (95% transmittance), at least 10% (90% transmittance), at least 15% (85% transmittance), at least 20% (80% transmittance), at least 25% absorption (75% transmittance), at least 50% absorption (50% transmittance), at least 60% absorption (40% transmittance), or at least 75% absorption (25% transmittance), within the 700 nm to 3000 nm. The near infrared absorbent material may selectively absorb radiation in the 700 nm to 3000 nm wavelength region. The near-infrared wavelengths being considered herein broadly encompass any of the wavelengths within 700 nm to 3000 nm. In various embodiments, the near infrared absorbent material may absorb radiation at wavelengths in a range bounded by a minimum wavelength of, for example, 700 nm, 750 nm, 800 nm, 850 nm, 900 nm, 950 nm, 1000 nm, 1050 nm, 1100 nm, or 1150 nm, and a maximum wavelength of, for example, 1000 nm, 1050 nm, 1100 nm, 1150 nm, 1200 nm, 1250 nm, 1300 nm, 1350 nm, 1400 nm, 1450 nm, 1500 nm, 1550 nm, 1600 nm, 1700 nm, 1800 nm, 2000 nm, 2500 nm, and 3000 nm. The near infrared absorbent material absorption ranges may be governed by any combination of the foregoing minimum and maximum values herein. The foregoing exemplary absorption ranges can be achieved either by use of a single near infrared absorbent material, or alternatively, by use of more than one near infrared absorbent material (e.g., two, three, or four near infrared absorbent materials).

Examples of suitable NIR absorbent materials include, but are not limited to, polymethine dyes, for example, cyanine dyes; phthalocyanine dyes; naphthalocyanine dyes;

metal complexes, for example, dithiolene dyes or nickel dithiolene; pyrilium dyes; thiopyrilium dyes; aminium dyes, for example, tris-aminium dyes or tetrakis-aminium dyes; azo dyes; rylene dyes; quinone and anthraquinone dyes; indoaniline dyes; squarylium dyes; lanthanum hexaboride; or dicopper hydroxide phosphate pigments. In some embodiments, the NIR absorbent material comprises cyanine dyes. Suitable NIR absorbent materials are also commercially available from Crysta-Lyn Chemical Company, Epolin Inc. (e.g., EPOLIGHT™ 1125, 2057, and 5547), Colorflex GmbH & Co. K G, Budenheim, H W Sands, CASorganic, LLC, Adam, Gates & Co., LLC, American Dye Source, and QCR Solutions Corp. In embodiments herein, the NIR absorbent materials may contain one or more of the aforementioned dyes and/or pigments.

In some embodiments, exemplary cyanine dyes may have the following formula:

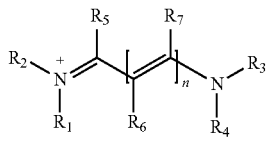

wherein R2, R3, R5, and R7, may independently comprise an alkyl group, an aryl group, a group having aromatic ring, a hydrogen atom, an alkoxy group, an alkoxy carbonyl group, a sulfonyl alkyl group, a cyano group, or a five- to seven-member ring that comprises one or more double bonds and is aromatic or non-aromatic, for example, phenyl, cyclopentyl, or cyclohexyl. R2 and R5 may be taken together to form a ring, as well as, R3 and R7. R1 and R4 may independently comprise a monovalent group having a carbon atom and may be an alkyl group, an aryl group, an alkoxy group, an alkoxy carbonyl group, a sulfonyl alkyl group, or a cyano group. R6 may comprise a hydrogen atom, a hydrocarbon group containing 1-7 carbon atoms (e.g., methyl, ethyl, vinyl, n-propyl, allyl, isopropyl, n-butyl, isobutyl, sec-butyl, t-butyl, n-pentyl, isopentyl, n-hexyl, phenyl, benzyl, tolyl), —S-Ph, —S—O$_2$-Ph, —O-Ph, —N(Ph)$_2$, and —N(CH$_3$)$_2$, where Ph indicates a phenyl (or phenylene) group, and wherein the phenyl group may comprise one or more substituents. n may be a number from 1 to 20.

In other embodiments, exemplary cyanine dyes may have the following formula:

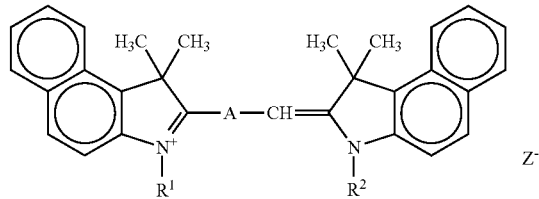

wherein A may comprise:

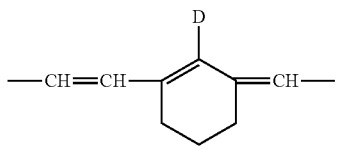

-continued

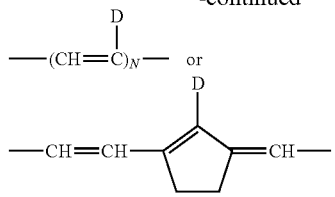

N is a number from 1 to 3, D is one of an alkyl group, diphenyl amino group, a halogen atom, and hydrogen atom, R1 and R2 are, independently, a monovalent group having a carbon atom and may be an alkyl group, an aryl group, an alkoxy group, an alkoxy carbonyl group, a sulfonyl alkyl group, or a cyano group, and Z— is a monovalent anion and may be I$^-$, Br$^-$, Cl$^-$, F$^-$, ClO$_4^-$, or BF$_4^-$, PF$_6^-$, SbF$_6^-$, AsF$_6^-$, CH$_3$SO$_4^-$, NO$_3^-$, CF$_3$COO$^-$, or CH$_3$—C$_6$H$_4$—SO$_3^-$.

In other embodiments, exemplary cyanine dyes may have the following formula:

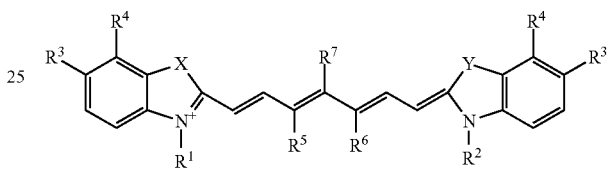

wherein X and Y are the same or different and may be heteroatoms, for example oxygen, and sulfur, or alternatively one or both of X and Y may be isopropylidene; R1 and R2 are the same or different and may be a lower alkyl of 1 to 6 carbon atoms, or 1 to 5 carbon atoms, or 1 to 4 carbon atoms, or 1 to 3 carbon atoms, or 1 to 2 carbon atoms, where the alkyl may be straight chained or branched; the alkyl substituent may terminate in a functional group such as, for example, sulfonate, sulfoxide, sulfate, sulfite, phosphate, and phosphite; R3 and R4 are the same or different (whether on the same ring or on different rings) and may be a lower alkyl of 1 to 6 carbon atoms, or 1 to 5 carbon atoms, or 1 to 4 carbon atoms, or 1 to 3 carbon atoms, or 1 to 2 carbon atoms, where the alkyl may be straight chained or branched; the alkyl substituent may terminate in a functional group such as, for example, sulfonate, sulfoxide, sulfate, sulfite, phosphate, and phosphite; specific examples of such substituted alkyl groups include alkyl sulfonates, where the alkyl group ranges from 2 to 4 carbon atoms in length; R3 and R4 may be taken together to form a ring, which may be a five- to seven-member ring that is aromatic or non-aromatic and which may be part of a polynuclear condensed ring system such as, for example, naphthyl, anthryl, and phenanthryl; R5 and R6 are the same or different and may be a lower alkyl of 1 to 6 carbon atoms, or 1 to 5 carbon atoms, or 1 to 4 carbon atoms, or 1 to 3 carbon atoms, or 1 to 2 carbon atoms, where the alkyl may be straight chained or branched; the alkyl substituent may terminate in a functional group such as, for example, sulfonate, sulfoxide, sulfate, sulfite, phosphate, and phosphite; R5 and R6 may be taken together to form a ring, which may be a five- to seven-member ring that comprises one or more double bonds and is aromatic or non-aromatic, for example; and R7 may be a halogen (e.g., chlorine, bromine, iodine), a lower alkyl of 1 to 6 carbon atoms, or 1 to 5 carbon atoms, or 1 to 4 carbon atoms, or 1 to 3 carbon atoms, or 1 to 2 carbon atoms, where the alkyl may be straight chained or branched; the alkyl substituent may terminate in a functional group such as, for example, sulfonate, sulfoxide, sulfate, sulfite, phosphate, and phosphite, or may terminate in a five to seven-member ring such as, for example, phenyl, cyclopentyl, and cyclohexyl, wherein the ring may comprise one or more substituents.

In further embodiments, exemplary cyanine dyes may have the following formula:

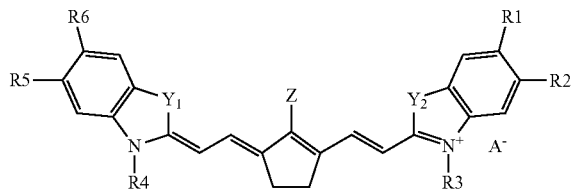

wherein Y1 and Y2 are independently selected from N, O, or S heteroatoms, or a $CR_2$ group, wherein R is independently a hydrogen atom or hydrocarbon group of 1 to 4 carbon atoms (e.g., methyl, ethyl, n-propyl, isopropyl, n-butyl, isobutyl, t-butyl, vinyl, and the like); R1, R2, R5, and R6 are independently selected from: (i) a hydrogen atom, or (ii) halide atom, or (iii) cyanide group, or (iv) hydroxy group, (v) a hydrocarbon group containing at least one, two, three, four, five, or six carbon atoms, or (vi) an aromatic or non-aromatic ring, and, in some embodiments, R1 and R2 may be taken together to form a ring and/or R5 and R6 may be taken together to form a ring; R3 and R4 are independently selected from a hydrocarbon group containing up to 12 carbon atoms, and may include, for example, saturated hydrocarbon groups (including, straight-chained or branched alkyl groups); and Z is selected from either a hydrogen atom, a halide, a hydrocarbon group containing 1-7 carbon atoms (e.g., methyl, ethyl, vinyl, n-propyl, allyl, isopropyl, n-butyl, isobutyl, sec-butyl, t-butyl, n-pentyl, isopentyl, n-hexyl, phenyl, benzyl, tolyl), —S-Ph, —S-Ph-$CH_3$, —S-Ph-$NH_2$, —S—$O_2$-Ph, —O-Ph, —O-Ph$CH_3$, —O— Ph$NH_2$, —N(Ph)$_2$, and —N($CH_3$)$_2$, where Ph indicates a phenyl (or phenylene) group; $A^-$ may be $I^-$, $Br^-$, $Cl^-$, $F^-$, $ClO_4^-$, or $BF_4^-$, $PF_6^-$, $SbF_6^-$, $AsF_6^-$, $CH_3SO_4^-$, $NO_3^-$, $CF_3COO^-$, or $CH_3$—$C_6H_4$—$SO_3^-$.

In some embodiments, the NIR absorbent materials may include phthalocyanine compounds, which may be a compound represented by the following:

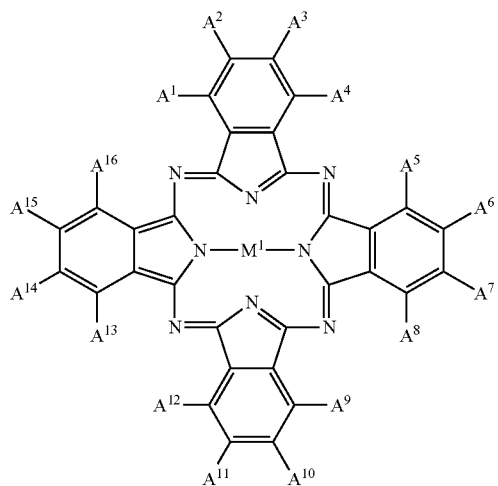

wherein A1 through A16 may be independently selected from: a hydrogen atom, a halogen atom, a hydroxyl group, an amino group, a hydroxysulfonyl group, an aminosulfonyl group, or a substituent having from 1 to 20 carbon atoms. The substituent having from 1 to 20 carbon atoms may contain either one of the following: a nitrogen atom, a sulfuratom, an oxygen atom, and a halogen atom. Adjacent two substituents may be bonded to each other via a conjugating group. Each of at least four of A1 through A16 is at least either one of a substituent via sulfur atom and a substituent via nitrogen atom. M1 may be selected from two hydrogen atoms, a divalent metallic atom, a trivalent or quadrivalent substituted metallic atom, and an oxy metal.

In some embodiments, the NIR absorbent materials may include naphthalocyanine compounds, which may be a compound represented by the following formula:

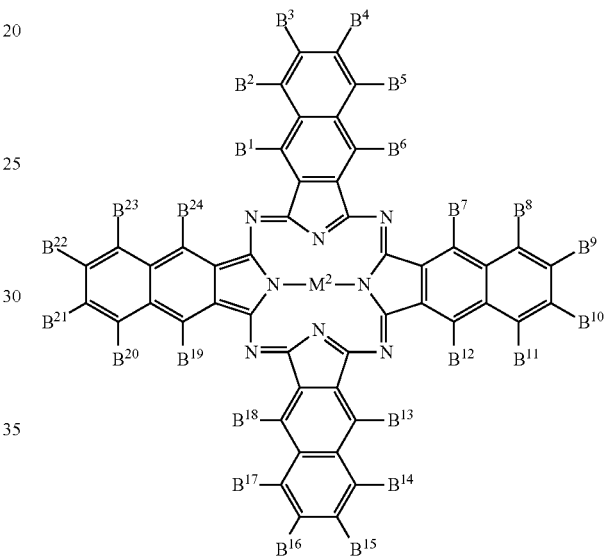

wherein B1 through B24 may be independently selected from: a hydrogen atom, a halogen atom, a hydroxyl group, an amino group, a hydroxysulfonyl group, an aminosulfonyl group, or a substituent having from 1 to 20 carbon atoms. The substituent having from 1 to 20 carbon atoms may contain a nitrogen atom, a sulfur atom, an oxygen atom, and a halogen atom. Adjacent two substituents may be bonded to each other via a conjugating group. Each of at least four of B1 through B24 is at least either one of a substituent via oxygen atom, a substituent via sulfur atom, a substituent via nitrogen atom. M2 is either one of the followings, i.e. two hydrogen atoms, a divalent metallic atom, a trivalent or quadrivalent substituted metallic atom, and an oxy metal.

In some embodiments, the NIR absorbent material may comprise a transition metal (nickel) dithiolene complex having the formula:

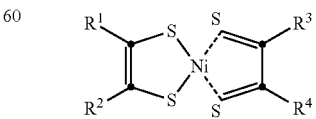

wherein each R1, R2, R3 and R4 independently represents a substituted or unsubstituted alkyl group having from 1 to about 10 carbon atoms, such as —CH3, —C2H5, —CH(CH3)2, —CH2-CH2-O—CH3,

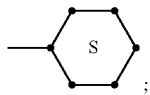

n-C4 H9, i-C4 H9, or t-C5 H11;

a substituted or unsubstituted aryl group having from about 6 to about 10 carbon atoms, such as:

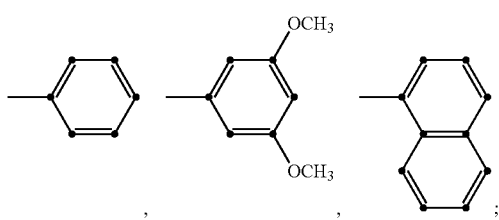

a substituted or unsubstituted heterocyclic group, such as:

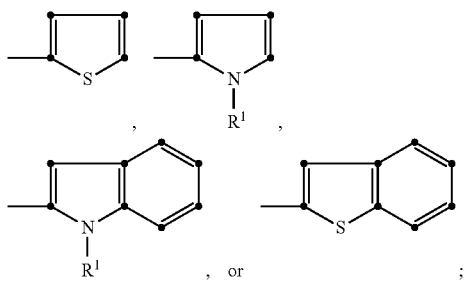

or R1 and R2 may be combined together with the carbon atoms to which they are attached to form a 5- or 6-membered carbocyclic or heterocyclic ring, such as:

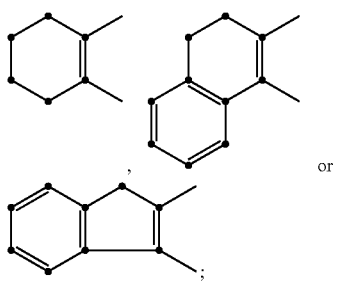

or R3 and R4 may be combined together with the carbon atoms to which they are attached to form a 5- or 6-membered ring, such as those listed above for R1 and R2. Other dithiolene complexes and their preparation are described in G. N. Schranzer and V. P. Mayweg, J. Am. Chem Soc., 84, 3221 (1962) and U.S. Pat. No. 4,753,923, which is incorporated herein by reference.

In some embodiments, the NIR absorbent material may comprise a diiminium compound having one of the following formulas:

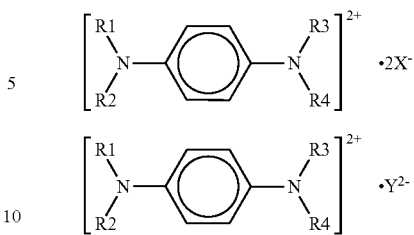

wherein R1-R4 may independently comprise at least one of an alkyl group, an aryl group, a group having aromatic ring, a hydrogen atom, and a halogen atom; $X^-$ is a monovalent anion, and $Y^{2-}$ is a divalent anion. The monovalent anion may be a halogen ion, such as, $I^-$, $Cl^-$, $Br^-$, or $F^-$; an inorganic acid ion such as $NO_3^-$, $BF_4^-$, $PF_6^-$, $ClO_4^-$, or $SbF_6^-$; an organic carboxylic acid ion such as $CH_3COO^-$, $CF_3COO^-$, or benzoic acid ion; an organic sulfonic acid ion such as $CH_3SO_3^-$, $CF_3SO_3^-$, benzenesulfonic acid ion, or naphthalenesulfonic acid ion. The divalent anion may be an aromatic disulfonic acid ion having two sulfonic acid groups. Specific examples may include an ion of naphthalenedisulfonic acid derivatives such as naphthalene-1,5-disulfonic acid, R acid, G acid, H acid, benzoyl H acid (a benzoyl group being attached to an amino group of H acid), p-chlorobenzoyl H acid, p-toluenesulfonyl H acid, chloro H acid (an amino group of H acid being replaced with a chlorine atom), chloroacetyl H acid, metanyl γ acid, 6-sulfonaphthyl-γ acid, C acid, ε acid, p-toluenesulfonyl R acid, naphthalene-1,6-disulfonic acid or 1-naphthol-4,8-disulfonic acid; carbonyl J acid, 4,4-diaminostilbene-2,2'-disulfonic acid, di-J acid, naphthalic acid, naphthalene-2,3-dicarboxylic acid, diphenic acid, stilbene-4,4'-dicarboxylic acid, 6-sulfo-2-oxy-3-naphthoic acid, anthraquinone-1,8-disulfonic acid, 1,6-diaminoanthraquinone-2,7-disulfonic acid, 2-(4-sulfophenyl)-6-aminobenzotriazole-5-sulfonic acid, 6-(3-methyl-5-pyrazolonyl)-naphthalene-1,3-disulfonic acid, 1-naphthol-6-(4-amino-3-sulfo)anilino-3-sulfonic acid, and the like.

In other embodiments, the NIR absorbent material may comprise a diiminium compound having the following formula:

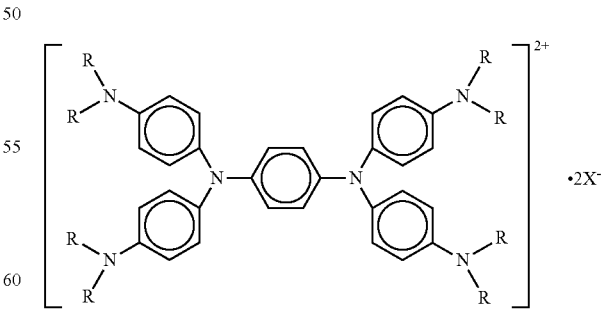

wherein R is an alkyl group having 1 to 8 carbon atoms, and $X^-$ is a monovalent anion as described above.

Some particular examples of dyes according to the present invention may include:

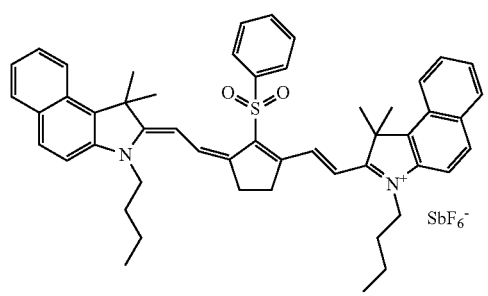
(I)
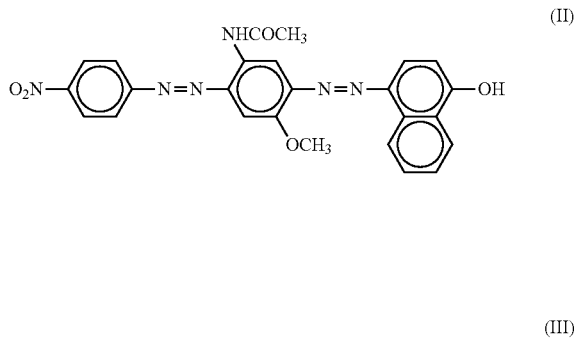
(II)
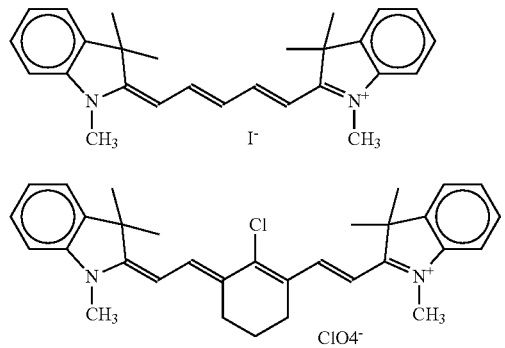
(III)
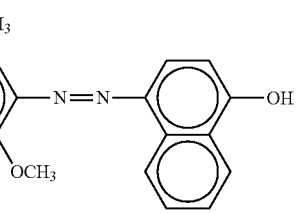
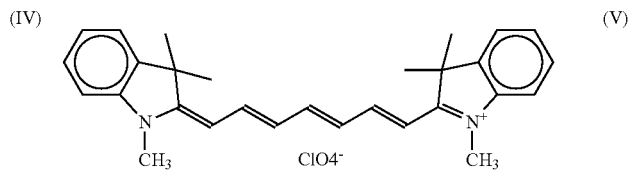
(IV) (V)
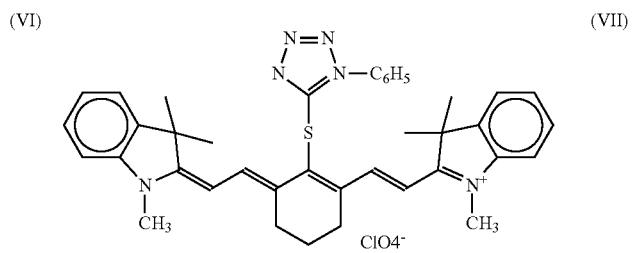
(VI) (VII)
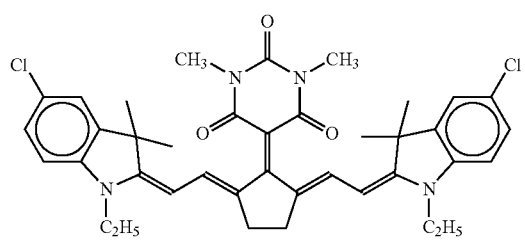
(VIII)
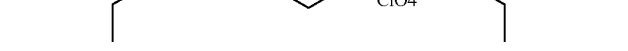
(IX)
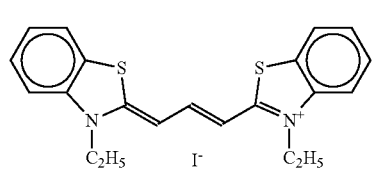
(X)
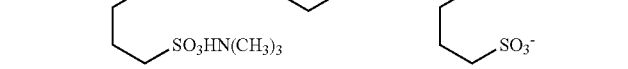
(XI)
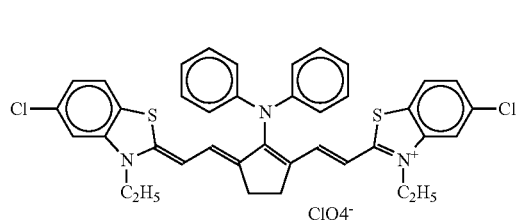
(XII)
(XIII)

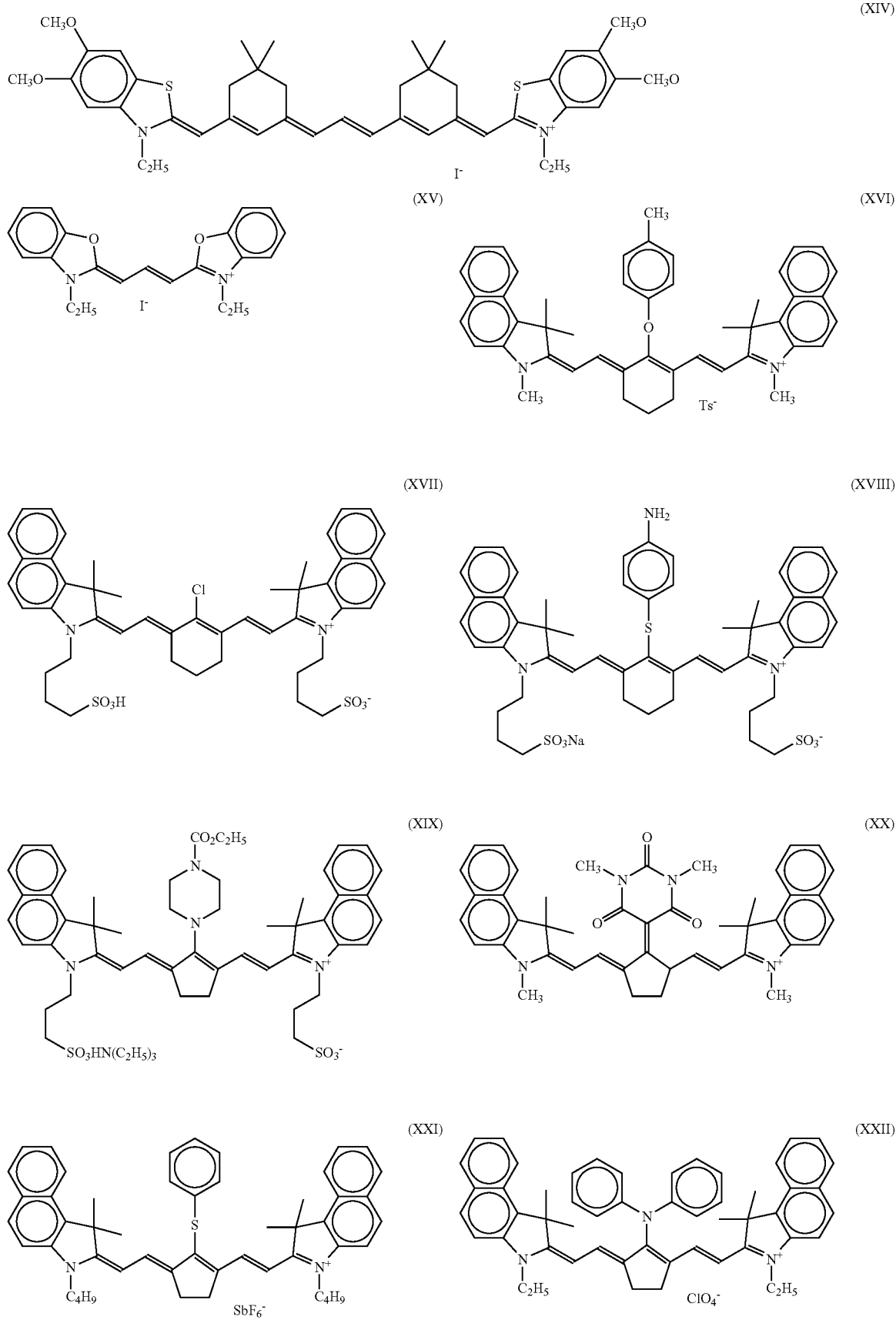

-continued

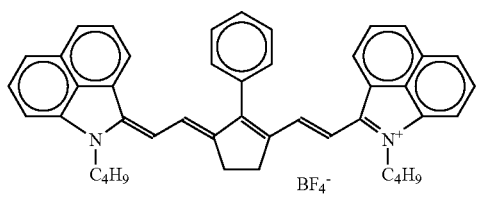
(XXIII)

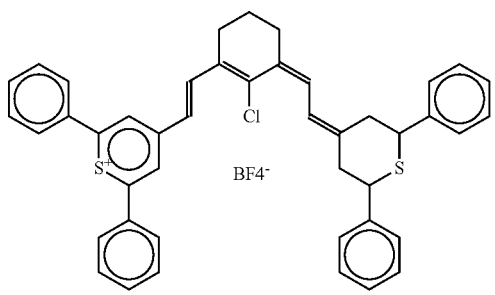
(XXIV)

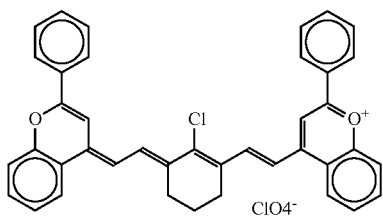
(XXV)

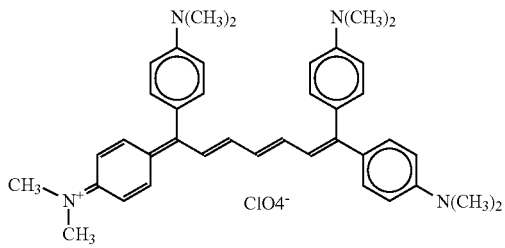
(XXVI)

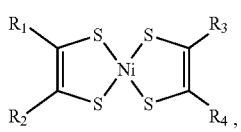

where R1, R2, R3, and R4 may independently comprise at least one of an alkyl group, an aryl group, a group having an aromatic ring, a hydrogen atom, and a halogen atom.

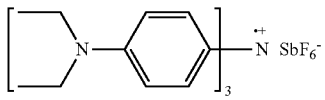
(XXVIII)

The NIR absorbent materials described herein can be prepared by any of the procedures known in the art, e.g., as described in N. Narayan et al, J. Org. Chem., 1995, 60, 2391-2395, the contents of which are incorporated by reference herein in its entirety. In some embodiments, the NIR absorbent materials are dispersed or dissolved into the adhesive. In other embodiments, the NIR absorbents are dispersed or dissolved into one component of a two component adhesive system.

In embodiments herein, the coating layer may comprise from 0.01 wt. % to 30 wt. % of the near-infrared absorbent material. All individual values and subranges are included and disclosed herein. For example, in some embodiments, the coating layer may comprise an amount of the near-infrared absorbent material of from 0.01 wt. % to 27.5 wt. %, from 0.01 wt. % to 25 wt. %, 0.01 wt. % to 22.5 wt. %, 0.01 wt. % to 20 wt. %, 0.01 wt. % to 17.5 wt. %, 0.01 wt. % to 15 wt. %, 0.01 wt. % to 12.5 wt. %, 0.01 wt. % to 10 wt. %, 0.01 wt. % to 7.5 wt. %, 0.01 wt. % to 5 wt. %, 0.01 wt. % to 4 wt. %, or 0.01 wt. % to 2.5 wt. %.

Coating Application

The coating layer described herein may be applied by methods known in the art, and can include, for example, by extrusion coating, or standard aqueous coating techniques, such as, curtain, gravure, brush, wire wound rod, knife over roll, dipping, and/or flexographic coating. Other examples for applying coating layers to a film may include, for example, spray coating, printing, such as, flexographic printing, inkjet printing, rotogravure printing, screen printing, and/or offset printing. In some embodiments, the coating layer is formed by extrusion coating. In other embodiments, the coating layer is formed by flexographic printing.

The coating layer may be formed to have a coating thickness in the range of 0.1 to 100 microns. All individual values and subranges from 0.1 to 100 microns are included herein and disclosed herein. For example, in some embodiments, the coating layer may have a coating thickness from a lower limit of 1, 5, 10, 15, 20, 30, 40, 50, 60, 70, 80, or 90 microns to an upper limit of 5, 10, 20, 30, 40, 50, 60, 70, 80, 90, 95, or 100 microns. In other embodiments, the coating layer may have a coating thickness in the range of 0.1 to 15, 0.1 to 10 microns, or 0.1 to 5 microns.

Additives

The polyethylene-based films may further comprise additional components such as one or more other polymers and/or one or more additives. Such additives include, but are not limited to, antistatic agents, color enhancers, dyes, lubricants, fillers, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The polyethylene-based films may contain from about 0.01 to about 10 percent by the combined weight of such additives, based on the total weight of the polyethylene-based film.

Films

The shrink films described herein may be monolayer films or multilayer films. In some embodiments, a monolayer film is disclosed. In other embodiments, a multilayer film is disclosed. The monolayer or multilayer film may be prepared by providing an polyethylene-based film as previously described herein, and forming a coating layer on a top surface of the polyethylene-based film to produce a monolayer film or a multilayer film.

In some embodiments, the shrink films comprise an polyethylene-based film having a top surface, a bottom surface, and comprising one or more layers, wherein at least one layer of the polyethylene-based film comprises a low density polyethylene having a density of from 0.917 g/cc to 0.935 g/cc and melt index, I2, of from 0.1 g/10 min to 5 g/10 min, a linear low density polyethylene having a density of from 0.900 g/cc to 0.965 g/cc and melt index, I2, of from 0.05 g/10 min to 15 g/10 min, or combinations thereof, and optionally, a medium density polyethylene, a high density polyethylene, or combinations thereof, and a coating layer disposed on the top surface of the polyethylene-based film, wherein the coating layer comprises an adhesive and a near-infrared absorbent material.

In some embodiments, the multilayer shrink films comprise an polyethylene-based film having a top surface and a bottom surface, wherein the polyethylene-based film comprises a core layer positioned between a first outer layer and a second outer layer, wherein the core layer comprises a low density polyethylene having a density of from 0.917 g/cc to 0.935 g/cc and melt index, I2, of from 0.1 g/10 min to 5 g/10 min, and optionally, a linear low density polyethylene, a medium density polyethylene, a high density polyethylene, or combinations thereof, and a coating layer disposed on the top surface of the polyethylene-based film, wherein the coating layer comprises an adhesive and a near-infrared absorbent material.

In some embodiments, the multilayer shrink films comprise a polyethylene-based film, wherein the polyethylene-based film comprises a core layer positioned between a first outer layer and a second outer layer, wherein the core layer comprises a low density polyethylene having a density of from 0.917 g/cc to 0.935 g/cc and melt index, I2, of from 0.1 g/10 min to 5 g/10 min, and optionally, a linear low density polyethylene, a medium density polyethylene, a high density polyethylene, or combinations thereof, and a coating layer positioned between the first outer layer and the second outer layer, wherein the coating layer comprises an adhesive and a near-infrared absorbent material. Other examples of suitable monolayer or multilayer film structures and polyethylene blends found in monolayer or multilayer film structures can be found in U.S. 2014/074468, U.S. Pat. No. 7,939,148, or U.S. Pat. No. 8,637,607, which are incorporated herein by reference.

In some embodiments herein, the polyethylene-based film present in the monolayer or multilayer shrink films may also have one or more layers that comprise from 0.01 wt. % to 30 wt. % of the near-infrared absorbent material. All individual values and subranges are included and disclosed herein. For example, in some embodiments, the polyethylene-based film may comprise an amount of the near-infrared absorbent material of from 0.01 wt. % to 27.5 wt. %, from 0.01 wt. % to 25 wt. %, 0.01 wt. % to 22.5 wt. %, 0.01 wt. % to 20 wt. %, 0.01 wt. % to 17.5 wt. %, 0.01 wt. % to 15 wt. %, 0.01 wt. % to 12.5 wt. %, 0.01 wt. % to 10 wt. %, 0.01 wt. % to 7.5 wt. %, 0.01 wt. % to 5 wt. %, 0.01 wt. % to 4 wt. %, or 0.01 wt. % to 2.5 wt. %. The near-infrared absorbing material present in the film absorbs radiation at wavelengths of from 700 nm to 3000 nm as previously described above. Suitable near-infrared absorbent materials are also previously described herein. In some embodiments, the NIR absorbent material comprises cyanine-based dyes.

In embodiments herein, the multilayer shrink films described herein may further comprise one or more intermediate layers positioned between a core layer and at least one outer layer. In some embodiments, the multilayer shrink films may comprise one or more intermediate layers positioned between a core layer and a first outer layer. In other embodiments, the multilayer shrink films may comprise one or more intermediate layers positioned between a core layer and a second outer layer. In further embodiments, the multilayer shrink films may comprise one or more intermediate layers positioned between a core layer and a first outer layer, and between a core layer and a second outer layer. The one or more intermediate layers may comprise ethylene-based polymers, such as, LDPE, LLDPE, MDPE, HDPE, or blends thereof. Suitable LDPE, LLDPE, MDPE, HDPE resins are previously described herein. In some embodiments, the one or more intermediate layers may also comprise near infrared absorbent material. The one or more intermediate layers may comprise stiffening layers, additional shrink layers, or additional layers which are neither shrink nor stiffening layers. Such additional layers may, for example, impart different functionality such as barrier layers, or tie layers, as is generally known in the art The first and second outer layers may be the same or different, and may have an ABA film structure, where the A skin layers may be the same or different in thickness, but are symmetrical in the composition, or an ABC film structure, where the A and C may be the same or different in thickness, but the skin layers are unsymmetrical in composition.

The thickness ratio of the at least one outer layer to the core layer can be any ratio suitable to maintain the optical and mechanical properties of a shrink film. In some embodiments, the thickness ratio of the at least one outer layer to the core layer may be 1:5 to 1:1, 1:4 to 1:1, 1:3 to 1:1, 1:2 to 1:1, or 1:1.5 to 1:1. The thickness ratio of the at least one outer layer to the core layer can also be captured by percentages. For example, in some embodiments, the core layer comprises from about 50 wt. % to about 95 wt. % of the overall film thickness. In other embodiments, the core layer comprises from about 60 wt. % to about 90 wt. % of the overall film thickness. In further embodiments, the core layer comprises from about 65 wt. % to about 85 wt. % of the overall film thickness.

In further embodiments, where the multilayer film comprises a core layer positioned between the first and second outer layers, the thickness ratio of the first and second outer layers to the core layer can be any ratio suitable to maintain the optical and mechanical properties of a shrink film. In some embodiments, the thickness ratio of the first and second outer layers to the core layer may be 1:10 to 1:1, 1:5 to 1:1, 1:4 to 1:1, 1:2 to 1:1, or 1:1.5 to 1:1. The thickness ratio of the first and second outer layers to the core layer can also be captured by percentages. For example, in some embodiments, the core layer comprises from about 50 wt. % to about 95 wt. % of the overall film thickness. In other embodiments, the core layer comprises from about 60 wt. % to about 90 wt. % of the overall film thickness. In further embodiments, the core layer comprises from about 65 wt. % to about 85 wt. % of the overall film thickness. The first and second outer layers may have an equal thickness, or alternatively, may have an unequal thickness. The monolayer or multilayer films described herein may have a total film thickness of 100 microns or less. All individual values and subranges are included and disclosed herein. For example, in some embodiments, the monolayer or multilayer films described herein may have a total film thickness of 75 microns or less, 50 microns or less, 45 microns or less, 40 microns or less, or 35 microns or less. While there is no minimum thickness contemplated for the monolayer or multilayer films of the present invention, practical considerations of current manufacturing equipment suggests that the minimum thickness will be at least 8 microns.

In some embodiments, the core layer may comprise from 5 to 100 wt. % of the low density polyethylene. All individual values and subranges, as described above for LDPEs, are included and disclosed herein. For example, the core layer may comprise from 5 to 95 wt. %, from 15 to 95 wt. %, from 25 to 95 wt. %, from 35 to 95 wt. %, from 45 to 95 wt. %, from 55 to 95 wt. %, from 65 to 95 wt. %, from 75 to 95 wt. %, or from 80 to 95 wt. %, of the low density polyethylene. In other examples, the core layer may comprise from 5 to 45 wt. %, from 5 to 40 wt. %, from 5 to 35 wt. %, from 5 to 30 wt. %, from 5 to 25 wt. %, or from 5 to 20 wt. %, of the low density polyethylene.

In other embodiments, the core layer comprises from 5 to 100 wt. % of the linear low density polyethylene having a density of from 0.900 g/cc to 0.965 g/cc and melt index, $I_2$, of from 0.1 g/10 min to 5 g/10 min. All individual values and subranges, as described above for LLDPE, are included and disclosed herein. For example, the core layer may comprise from 5 to 95 wt. %, from 15 to 95 wt. %, from 25 to 95 wt. %, from 35 to 95 wt. %, from 45 to 95 wt. %, from 55 to 95 wt. %, from 65 to 95 wt. %, from 75 to 95 wt. %, or from 80 to 95 wt. %, of the linear low density polyethylene. In other examples, the core layer may comprise from 5 to 45 wt. %, from 5 to 40 wt. %, from 5 to 35 wt. %, from 5 to 30 wt. %, from 5 to 25 wt. %, or from 5 to 20 wt. %, of the linear low density polyethylene.

In further embodiments, the core layer comprises 5 to 100 wt. % of the low density polyethylene and from 5 to 100 wt. % of the linear low density polyethylene having a density of from 0.900 g/cc to 0.965 g/cc and melt index, $I_2$, of from 0.1 g/10 min to 5 g/10 min. All individual values and subranges are included and disclosed herein. For example, the core layer may comprise 5 to 50 wt. %, 5 to 45 wt. %, 10 to 45 wt. %, 15 to 45 wt. %, 20 to 45 wt. %, or 25 to 45 wt. % of the low density polyethylene, and from 50 to 95 wt. %, 55 to 95 wt. %, 55 to 90 wt. %, 55 to 85 wt. %, 55 to 80 wt. %, or 55 to 75 wt. % of the linear low density polyethylene. In other examples, the core layer may comprise 50 to 95 wt. %, 55 to 95 wt. %, 60 to 95 wt. %, 65 to 95 wt. %, 70 to 95 wt. %, or 70 to 90 wt. % of the low density polyethylene and from 5 to 50 wt. %, 5 to 45 wt. %, 5 to 40 wt. %, 5 to 35 wt. %, 5 to 30 wt. %, or 10 to 30 wt. % of the linear low density polyethylene.

In embodiments herein, the at least one outer layer of the shrink film or the first and second outer layers of the multilayer shrink film may independently comprise a LDPE, LLDPE, MDPE, HDPE, or combinations thereof. Suitable LDPE, LLDPE, MDPE, HDPE, or combinations thereof are previously disclosed herein. In some embodiments, the at least one outer layer comprises LLDPE. In other embodiments, the at least one outer layer comprises LDPE and LLDPE. In further embodiments, the at least one outer layer comprises from 50 to 100%, by weight, of a LLDPE.

The monolayer films and/or the multilayer films described herein may be oriented. In some embodiments, the monolayer films and/or the multilayer films may be uniaxially-oriented. Uniaxial stretching can be performed using a conventional tenter or in a length orienter, such as length orientation between rollers rotating at different speeds. A general discussion of film processing techniques can be found in "Film Processing," Chs. 1, 2, 3, 6 & 7, edited by Toshitaka Kanai and Gregory Campbell, 2013. See also WO 2002/096622, which discloses stretching in a parabolic-path tenter.

In other embodiments, the monolayer films and/or the multilayer films may be biaxially-oriented. In some embodiments, the monolayer films and multilayer films may be biaxially-oriented below its highest melting point. The highest melting point for the films herein may be determined by using the melting peak with the highest temperature as determined by DSC. The films may be biaxially oriented using methods, such as, tenter framing, double bubble, trapped bubble, tape orientation or combinations thereof. In some embodiments, the films may be biaxially oriented using a double bubble or tenter framing process. The films described herein are thought to be generally applicable to operations where the fabrication and orientation steps are separable as well as to operations where fabrication and orientation occur simultaneously or sequentially as part of the operation itself (e.g., a double bubble technique or tenter framing).

The monolayer films and/or the multilayer films described herein may be cross-linked. In some embodiments, electron beam can be used to cross-link. In other embodiment, the films may be formulated with a cross-linking agent, such as, pro-rad agents, including triallyl cyanurate as described by Warren in U.S. Pat. No. 4,957,790, and/or with antioxidant crosslink inhibitors, such as butylated hydroxytoluene as described by Evert et al. in U.S. Pat. No. 5,055,328.

The monolayer films and/or one or more layers of the multilayer films may further comprise additional components, such as, one or more other polymers and/or one or more additives. Example polymer additives have been described in Zweifel Hans et al., "Plastics Additives Handbook," Hanser Gardner Publications, Cincinnati, Ohio, 5th edition (2001), which is incorporated herein by reference in its entirety. Such additives include, but are not limited to, antistatic agents, color enhancers, dyes, lubricants, fillers, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The total amount of the additives present in monolayer films and/or multilayer films may range from about 0.1 combined wt. % to about 10 combined wt. %, by weight of a layer.

The monolayer films and/or multilayer films described herein may be manufactured by coextruding a primary tube, and orienting the primary tube to form a film. In some embodiments, the process comprises coextruding a multilayer primary tube, and orienting the multilayer primary tube to form a multilayer film. In other embodiments, the process comprises extruding a monolayer primary tube, and orienting the monolayer primary tube to form a monolayer film. Production of a monolayer shrink film is described in U.S. Patent Publication No. 2011/0003940, the disclosure of which is incorporated in its entirety herein by reference. Film manufacturing processes are also described in U.S. Pat. Nos. 3,456,044 (Pahlke), U.S. Pat. No. 4,352,849 (Mueller), U.S. Pat. Nos. 4,820,557 and 4,837,084 (both to Warren), U.S. Pat. No. 4,865,902 (Golike et al.), U.S. Pat. No. 4,927,708 (Henan et al.), U.S. Pat. No. 4,952,451 (Mueller), and U.S. Pat. Nos. 4,963,419, and 5,059,481 (both to Lustig et al.), the disclosures of which are incorporated herein by reference.

In some embodiments, a method of making a shrink film comprises providing an polyethylene-based film having a top surface, a bottom surface, and comprising one or more layers, wherein at least one layer of the polyethylene-based film comprises a low density polyethylene having a density of from 0.917 g/cc to 0.935 g/cc and melt index, I2, of from 0.1 g/10 min to 5 g/10 min, a linear low density polyethylene having a density of from 0.900 g/cc to 0.965 g/cc and melt index, I2, of from 0.05 g/10 min to 15 g/10 min, or combinations thereof, and optionally, a medium density polyethylene, a high density polyethylene, or combinations thereof, and forming a coating layer on the top surface of the polyethylene-based film, wherein the coating layer comprises an adhesive and a near-infrared absorbent material.

In other embodiments, method of making a multilayer shrink film comprises providing a polyethylene-based film having a top surface and a bottom surface, wherein the polyethylene-based film comprises a core layer positioned between a first outer layer and a second outer layer, wherein the core layer comprises a low density polyethylene having a density of from 0.917 g/cc to 0.935 g/cc and melt index, I2, of from 0.1 g/10 min to 5 g/10 min, and optionally, a linear low density polyethylene, a medium density polyethylene, a high density polyethylene, or combinations thereof, and forming a coating layer on the top surface of the polyethylene-based film, wherein the coating layer comprises an adhesive and a near-infrared absorbent material.

In further embodiments, method of making a multilayer shrink film comprises providing a polyethylene-based film, wherein the polyethylene-based film comprises a core layer positioned between a first outer layer and a second outer layer, wherein the core layer comprises a low density polyethylene having a density of from 0.917 g/cc to 0.935 g/cc and melt index, I2, of from 0.1 g/10 min to 5 g/10 min, and optionally, a linear low density polyethylene, a medium density polyethylene, a high density polyethylene, or combinations thereof, and positioning a coating layer between the first outer layer and the second outer layer, wherein the coating layer comprises an adhesive and a near-infrared absorbent material.

In some embodiments, the methods described herein further comprise corona-treating the surface of the polyethylene-based film that the coating layer is to be formed upon. In other embodiments, the methods described herein further comprise corona-treating the top surface of the polyethylene-based film. In further embodiments, the methods described herein further comprise corona-treating the core layer of the polyethylene-based film. The coating layer may be formed as previously described herein and can include by spraying, coating, printing, or a combination thereof.

The monolayer shrink films and/or multilayer shrink films described herein may exhibit at least one characteristic selected from the group consisting of 45 degree gloss, total haze, 1% cross direction (CD) secant modulus, 1% machine direction (MD) secant modulus, CD shrink tension, MD shrink tension, puncture resistance, dart drop impact strength, CD shrinkage %, and/or MD shrinkage %, having individual values or ranges as described below. That is, any combination of characteristics may be exhibited by the monolayer films and/or multilayer films described herein. For example, in some embodiments, the monolayer films and/or multilayer films described herein may exhibit a 45 degree gloss of at least 50%. All individual values and subranges are included and disclosed herein. For example, the monolayer films and/or multilayer films described herein may have a 45 degree gloss of at least 55%, 60%, 65%, or 70%.

In some embodiments, the monolayer films and/or multilayer films described herein may have a total haze value of less than 15%. All individual values and subranges are included and disclosed herein. For example, the monolayer films and/or multilayer films described herein may have a total haze value of less than 14%, 12%, or 10%. The monolayer films and/or multilayer films described herein may also have a total haze value of 5% to 15%, 5% to 14%, 5% to 12%, or 5% to 10%.

In some embodiments, the monolayer films and/or multilayer films described herein may have a 1% CD Secant Modulus of 43,000 psi or greater. All individual values and subranges are included and disclosed herein. For example, the monolayer films and/or multilayer films described herein may have a 1% CD Secant Modulus of 44,000 psi or greater, 45,000 psi or greater, 50,000 psi or greater, or 55,000 psi or greater. In some embodiments, the monolayer films and/or multilayer films described herein may have a 1% MD Secant Modulus of 38,000 psi or greater. All individual values and subranges are included and disclosed herein. For example, the monolayer films and/or multilayer films described herein may have a 1% MD Secant Modulus of 40,000 psi or greater, 45,000 psi or greater, 48,000 psi or greater, 50,000 psi or greater, or 55,000 psi or greater.

In some embodiments, the monolayer films and/or multilayer films described herein may have a CD shrink tension of at least 0.7 psi. All individual values and subranges are included and disclosed herein. For example, the monolayer films and/or multilayer films described herein may have a CD shrink tension of at least 0.8 psi, 0.9 psi, or 1.0 psi. In some embodiments, the monolayer films and/or multilayer films described herein may have a MD shrink tension of at least 10 psi. All individual values and subranges are included and disclosed herein. For example, the monolayer films and/or multilayer films described herein may have a MD shrink tension of at least 12 psi, 15 psi, 18 psi, or 20 psi.

In some embodiments, the monolayer films and/or multilayer films described herein may have a puncture resistance of at least 2.0 J/cm$^3$. All individual values and subranges are included and disclosed herein. For example, the monolayer films and/or multilayer films described herein may have a puncture resistance of at least 2.2 J/cm$^3$, at least 2.4 J/cm$^3$, at least 2.6 J/cm$^3$, at least 2.8 J/cm$^3$, at least 3.0 J/cm$^3$, at least 3.5 J/cm$^3$, or at least 4.0 J/cm$^3$.

In some embodiments, the monolayer films and/or multilayer films described herein may have a dart drop impact strength of at least 300 g. All individual values and subranges are included and disclosed herein. For example, the monolayer films and/or multilayer films described herein may have a dart drop impact strength of at least 350 g, at least 400 g, at least 450 g, at least 500 g, or at least 525 g.

In some embodiments, the monolayer films and/or multilayer films described herein may have a CD shrinkage % from 0% to 25%. All individual values and subranges are included and disclosed herein. For example, the monolayer films and/or multilayer films described herein may have a CD shrinkage % from 1% to 25%, from 3% to 25%, from 1% to 20%, from 3% to 20%, from 5% to 20%, from 5% to 18%, or from 5% to 15%. In some embodiments, the monolayer films and/or multilayer films described herein may have a MD shrinkage % of from 25% to 90%. All individual values and subranges are included and disclosed herein. For example, in some embodiments, the monolayer films and/or multilayer films described herein may have a MD shrinkage % of from 25% to 85%, from 25% to 80%, 25% to 75%, 25% to 70% or 25% to 65%. In other embodiments, the monolayer films and/or multilayer films described herein may have a MD shrinkage % of from 40% to 90%, from 40% to 85%, from 40% to 80%, from 40% to 75%, from 40% to 70%, from 50% to 90%, from 50% to 80%, from 50% to 75%, or from 50% to 70%.

The monolayer films and/or multilayer films described herein may be used for any purpose generally known in the art. Such uses may include, but are not limited to, clarity shrink films, collation shrink films, shrink hood films, heavy duty shipping sacks, block bottom bag and stand-up pouch films, liner films, machine direction oriented films, silobags, and diaper compression packaging bags. Different methods may be employed to manufacture such films. Suitable conversion techniques include, but are not limited to, blown film extrusion process, cast film extrusion process, vertical or horizontal form fill and seal process. Such techniques are generally well known. In some embodiments, the films may be manufactured using a blown film extrusion process. Blown film extrusion processes are essentially the same as regular extrusion processes up until the die. The die in a blown film extrusion process is generally an upright cylinder with a circular opening similar to a pipe die. The diameter can be a few centimeters to more than three meters across. The molten plastic is pulled upwards from the die by a pair of nip rolls above the die (from 4 meters to 20 meters or more above the die depending on the amount of cooling required). Changing the speed of these nip rollers will change the gauge (wall thickness) of the film. Around the die sits an air-ring. The air-ring cools the film as it travels upwards. In the center of the die is an air outlet from which compressed air can be forced into the center of the extruded circular profile, creating a bubble. This expands the extruded circular cross section by some ratio (a multiple of the die diameter). This ratio, called the "blow-up ratio" or "BUR" can be just a few percent to more than 200 percent of the original diameter. The nip rolls flatten the bubble into a double layer of film whose width (called the "layflat") is equal to ½ the circumference of the bubble. This film can then be spooled or printed on, cut into shapes, and heat sealed into bags or other items. In some instances a blown film line capable of producing a greater than desired number of layers may be used. For example, a five layer line may be used to produce a 3 layered shrink film. In such cases, one or more of the shrink film layers comprises two or more sub-layers, each sub-layer having an identical composition.

In some embodiments, the monolayer films and/or multilayer films described herein may be used as collation shrink films. The collation shrink films may be used to wrap household, food, healthcare or beverage products, in particular products that are packaged in containers such as bottles, cans, tubs and the like. Wherever a product is shipped in numerous essentially identical containers, the use of collation shrink film is useful to prevent damage to the products and keep the product secure during transport. A common application is in the beverage transportation market. It will be appreciated that collation shrink films might also be used to wrap industrial products such as chemicals and the like.

To wrap household, food, healthcare or beverage products, the monolayer and/or multilayer films may be wrapped around groups of articles, e.g., water bottles, and then shrinking wrap around the articles to form a package. See, for e.g., U.S. Pat. No. 3,545,165. To shrink the wrap around the articles, the articles may be fed into a heat tunnel where a laser beam may be used to heat shrink the films, with the wavelength of the laser beam adjusted to match the absorption spectrum of the film. For example, a suitable heat tunnel and shrink wrap film process is discussed in copending U.S. Application Ser. No. 62/085,781, titled "Laser Heat Film Processing", filed herewith, the disclosure of which is incorporated herein by reference. The closed ends of the packages (known as "bulls eyes") are at ends of the packages in the direction of travel. In the packaging industry, aesthetics has become an increasingly important issue, both for the package that is produced and the machine that produces it. When the film is shrunk around the end of a package, it should leave a circular opening, the "bulls eye", and should be free of wrinkles.

In other embodiments, the monolayer films and/or multilayer films described herein may be used as shrink hood films. The shrink hood films may be used on palletized loads prior to transport. The film is typically preformed and is placed loosely over the load. The film is then heated by an array of laser beams that translate up and down the load. Upon heating, the film shrinks and tightly conforms to the palletized load. The use of laser beams, in conjunction with the films described herein, can reduce the energy used to shrink the films. In this case, the film is exposed to the laser light only long enough to generate enough heat to shrink the film. This technology allows for more compact packaging lines that may use less energy than a gas or electrically heated shrink equipment. Of course, these are mere examples of applications for the monolayer films and/or multilayer films described herein.

Test Methods

Unless otherwise stated, the following test methods are used. All test methods are current as of the filing date of this disclosure.

Density

Density is measured according to ASTM D792, Method B.

Melt Index

Melt index, or $I_2$, is measured according to ASTM D1238 at 190° C., 2.16 kg. Melt index, or $I_{10}$, is measured in accordance with ASTM D1238 at 190° C., 10 kg. Melt index, or $I_{21}$, is measured in accordance with ASTM D1238 at 190° C., 21.6 kg.

Total (Overall) Haze

Total haze is measured according to ASTM D1003-07. A Hazegard Plus (BYK-Gardner USA; Columbia, Md.) is used for testing. For each test, five samples are examined, and an average reported. The sample dimensions are "6 in×6 in."

45° Gloss

45° Gloss is measured according to ASTM D2457-08. Five samples are examined, and an average reported. The sample dimensions are about "10 in×10 in".

Dart Drop Impact Strength

Dart Drop Impact Strength is measured according to ASTM-D 1709-04, Method A.

1% Secant Modulus, Tensile Break Strength, & Tensile Break Elongation %

1% secant modulus, tensile break strength, and tensile break elongation % is measured in the machine direction (MD) and cross direction (CD) with an Instron universal tester according to ASTM D882-10. The 1% secant modulus, tensile break strength, and tensile break elongation % is determined using five film samples in each direction, with each sample being "1 in×6 in" in size.

Elemendorf Tear Strength

Elemendorf tear strength is measured according to ASTM D-1922, Method B.

Puncture Resistance Puncture resistance is measured on an Instron Model 4201 with Sintech Testworks Software Version 3.10. The specimen size is 6"×6" and 4 measurements are made to determine an average puncture value. The film is conditioned for 40 hours after film production and at least 24 hours in an ASTM controlled laboratory (23° C. and 50% relative humidity). A 100 lb load cell is used with a round specimen holder. The specimen is a 4 inch diameter circular specimen. The puncture probe is a ½ inch diameter polished stainless steel ball (on a 2.5 inch rod) with a 7.5 inch maximum travel length. There is no gauge length; the probe is as close as possible to, but not touching, the specimen. The probe is set by raising the probe until it touched the specimen. Then the probe is gradually lowered, until it is not touching the specimen. Then the crosshead is set at zero. Considering the maximum travel distance, the distance would be approximately 0.10 inch. The crosshead speed used is 10 inches/minute. The thickness is measured in the middle of the specimen. The thickness of the film, the distance the crosshead traveled, and the peak load are used to determine the puncture by the software. The puncture probe is cleaned using a "Kim-wipe" after each specimen.

Shrink Tension

Shrink tension is measured according to the method described in Y. Jin, T. Hermel-Davidock, T. Karjala, M. Demirors, J. Wang, E. Leyva, and D. Allen, "Shrink Force Measurement of Low Shrink Force Films", SPE ANTEC Proceedings, p. 1264 (2008). The shrink tension of film samples are measured through a temperature ramp test and conducted on an RSA-III Dynamic Mechanical Analyzer (TA Instruments; New Castle, Del.) with a film fixture. The film specimens are "12.7 mm wide" and "63.5 mm long," and are die cut from the film sample, either in the machine direction (MD) or the cross direction (CD), for testing. The film thickness is measured by a Mitutoyo Absolute digimatic indicator (Model C112CEXB). This indicator has a maximum measurement range of 12.7 mm, with a resolution of 0.001 mm. The average of three thickness measurements, at different locations on each film specimen, and the width of the specimen, are used to calculate the film's cross sectional area (A), in which "A=Width×Thickness" of the film specimen used in shrink film testing. A standard film tension fixture from TA Instruments is used for the measurement. The oven of the RSA-III is equilibrated at 25° C. for at least 30 minutes, prior to zeroing the gap and the axial force. The initial gap is set to 20 mm The film specimen are then attached onto both the upper and the lower fixtures. Typically, measurements for MD only require one ply film. Because the shrink tension in the CD direction is typically low, two or four plies of films are stacked together for each measurement to improve the signal-to-noise ratio. In such a case, the film thickness is the sum of all of the plies. In this work, a single ply is used in the MD direction and two plies are used in the CD direction. After the film reaches the initial temperature of 25° C., the upper fixture is manually raised or lowered slightly to obtain an axial force of −1.0 g. This is to ensure that no buckling or excessive stretching of the film occurs at the beginning of the test. Then the test is started. A constant fixture gap is maintained during the entire measurement. The temperature ramp starts at a rate of 90° C./min, from 25° C. to 80° C., followed by a rate of 20° C./min from 80° C. to 160° C. During the ramp from 80° C. to 160° C., as the film shrunk, the shrink force, measured by the force transducer, is recorded as a function of temperature for further analysis. The difference between the "peak force" and the "baseline value before the onset of the shrink force peak" is considered the shrink force (F) of the film. The shrink tension of the film is the ratio of the shrink force (F) to the cross sectional area (A) of the film.

CD & MD % Shrinkage

A 4"×4" specimen of a film sample is placed in a film holder then immersed in a hot oil bath for 30 seconds at the desired temperature. The oil used is Dow Corning 210H. After 30 seconds, the film holder/sample is removed, allowed to cool, and then the specimen is measured in both the machine and cross directions. The % shrinkage in either the MD or CD is calculated from the measurement of the initial length of the sample, Lo, vs. the newly measured length after being in the hot oil bath per the above procedure, Lf.

$$\% \text{ Shrinkage} = \frac{(Lf - Lo)}{Lo} \times 100\%$$

Melt Strength

Melt strength is measured at 190° C. using a Goettfert Rheotens 71.97 (Goettfert Inc.; Rock Hill, S.C.), melt fed with a Goettfert Rheotester 2000 capillary rheometer equipped with a flat entrance angle (180 degrees) of length of 30 mm and diameter of 2 mm. The pellets are fed into the barrel (L=300 mm, Diameter=12 mm), compressed and allowed to melt for 10 minutes before being extruded at a constant piston speed of 0.265 mm/s, which corresponds to a wall shear rate of 38.2 s$^{-1}$ at the given die diameter. The extrudate passes through the wheels of the Rheotens located at 100 mm below the die exit and is pulled by the wheels downward at an acceleration rate of 2.4 mm/s$^2$. The force (in cN) exerted on the wheels is recorded as a function of the velocity of the wheels (mm/s). Melt strength is reported as the plateau force (cN) before the strand breaks.

Triple Detector Gel Permeation Chromatography (TDGPC)

High temperature TDGPC analysis is performed on an ALLIANCE GPCV2000 instrument (Waters Corp.) set at 145° C. The flow rate for the GPC is 1 mL/min. The injection volume is 218.5 μL. The column set consists of four, Mixed-A columns (20-μm particles; 7.5×300 mm; Polymer Laboratories Ltd).

Detection is achieved by using an IR4 detector from PolymerChAR, equipped with a CH-sensor; a Wyatt Technology Dawn DSP Multi-Angle Light Scattering (MALS) detector (Wyatt Technology Corp., Santa Barbara, Calif., USA), equipped with a 30-mW argon-ion laser operating at λ=488 nm; and a Waters three-capillary viscosity detector. The MALS detector is calibrated by measuring the scattering intensity of the TCB solvent. Normalization of the photodiodes is done by injecting SRM 1483, a high density polyethylene with weight-average molecular weight (Mw) of 32,100 g/mol and polydispersity (molecular weight distribution, Mw/Mn) of 1.11. A specific refractive index increment (dn/dc) of −0.104 mL/mg, for polyethylene in 1,2,4-trichlorobenzene (TCB), is used.

The conventional GPC calibration is done with 20 narrow MWD, polystyrene (PS) standards (Polymer Laboratories Ltd.) with molecular weights in the range 580-7,500,000 g/mol. The polystyrene standard peak molecular weights are converted to polyethylene molecular weights using the following equation:

$$M_{polyethylene} = A \times (M_{polystyrene})^B,$$

with A=0.39 and B=1. The value of A is determined by using a linear high density polyethylene homopolymer (HDPE) with Mw of 115,000 g/mol. The HDPE reference material is also used to calibrate the IR detector and viscometer by assuming 100% mass recovery and an intrinsic viscosity of 1.873 dL/g.

Distilled "Baker Analyzed" grade 1,2,4-trichlorobenzene (J. T. Baker, Deventer, The Netherlands), containing 200 ppm of 2,6-di-tert-butyl-4-methylphenol (Merck, Hohenbrunn, Germany), is used as the solvent for sample preparation, as well as for the TDGPC experiment. HDPE SRM 1483 is obtained from the U.S. National Institute of Standards and Technology (Gaithersburg, Md., USA).

LDPE solutions are prepared by dissolving the samples under gentle stirring for three hours at 160° C. The polystyrene standards are dissolved under the same conditions for 30 minutes. The sample concentration is 1.5 mg/mL, and the polystyrene concentrations are 0.2 mg/mL.

A MALS detector measures the scattered signal from polymers or particles in a sample under different scattering angles θ. The basic light scattering equation (from M. Anderson, B. Wittgren, K. G. Wahlund, Anal. Chem. 75, 4279 (2003)) can be written as follows:

$$\sqrt{\frac{Kc}{R_\theta}} = \sqrt{\frac{1}{M} + \frac{16\pi^2}{3\lambda^2}\frac{1}{M}Rg^2\sin^2\left(\frac{\theta}{2}\right)},$$

where $R_\theta$ is the excess Rayleigh ratio, K is an optical constant, which is, among other things, dependent on the specific refractive index increment (dn/dc), c is the concentration of the solute, M is the molecular weight, $R_g$ is the radius of gyration, and λ is the wavelength of the incident light. Calculation of the molecular weight and radius of gyration from the light scattering data require extrapolation to zero angle (see also P. J. Wyatt, Anal. Chim Acta 272, 1 (1993)). This is done by plotting $(Kc/R_\theta)^{1/2}$ as a function of $\sin^2(\theta/2)$ in the so-called Debye plot. The molecular weight can be calculated from the intercept with the ordinate, and the radius of gyration from initial slope of the curve. The second virial coefficient is assumed to be negligible. The intrinsic viscosity numbers are calculated from both the viscosity and concentration detector signals by taking the ratio of the specific viscosity and the concentration at each elution slice.

ASTRA 4.72 (Wyatt Technology Corp.) software is used to collect the signals from the IR detector, the viscometer, and the MALS detector, and to run the calculations.

The calculated molecular weights, e.g. the absolute weight average molecular weight Mw(abs), and absolute molecular weight distribution (e.g., Mw(abs)/Mn(abs)) are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 Daltons. The viscometer calibration can be accomplished using the methods described by the manufacturer, or alternatively, by using the published values of suitable linear standards such as Standard Reference Materials (SRM) 1475a, 1482a, 1483, or 1484a. The chromatographic concentrations are assumed low enough to eliminate addressing 2nd virial coefficient effects (concentration effects on molecular weight).

The obtained MWD(abs) curve from TDGPC is summarized with three characteristic parameters: the absolute weight average molecular weight Mw(abs), the absolute number average molecular weight Mn(abs), and w, where w is defined as "weight fraction of molecular weight greater than 106 g/mole, based on the total weight of polymer, and as determined by GPC(abs)."

In equation form, the parameters are determined as follows. Numerical integration from the table of "log M" and "dw/d log M" is typically done with the trapezoidal rule:

$$Mw(\text{abs}) = \int_{-\infty}^{\infty} M \frac{dw}{d\log M} d\log M,$$

$$Mn(\text{abs}) = \frac{1}{\int_{-\infty}^{\infty} \frac{1}{M}\frac{dw}{d\log M}d\log M}, \text{ and}$$

$$w = \int_6^{\infty} \frac{dw}{d\log M} d\log M.$$

Conventional Gel Permeation Chromatography

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4-trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene} = 0.4316 \times (M_{polystyrene})$. Polyethylene equivalent molecular weight calculations are performed using Viscotek TriSEC software Version 3.0.

Number-, weight- and z-average molecular weights are calculated according to the following equations:

$$M_n = \frac{\sum_i Wf_i}{\sum_i \left(\frac{Wf_i}{M_i}\right)}$$

$$M_w = \frac{\sum_i (Wf_i * M_i)}{\sum_i Wf_i}$$

$$M_z = \frac{\sum_i (Wf_i * M_i^2)}{\sum_i Wf_i * M_i}$$

wherein Mn is the number average molecular weight, Mw, is the weight average molecular weight, Mz is the z-average molecular weight, $Wf_i$ is the weight fraction of the molecules with a molecular weight of $M_i$.

Differential Scanning Calorimetry (DSC)

Baseline calibration of the TA DSC Q1000 is performed by using the calibration wizard in the software. First, a baseline is obtained by heating the cell from −80° C. to 280° C. without any sample in the aluminum DSC pan. After that, sapphire standards are used according to the instructions in the wizard. Then about 1-2 mg of a fresh indium sample is analyzed by heating the sample to 180° C., cooling the sample to 120° C. at a cooling rate of 10° C./min, keeping the sample isothermally at 120° C. for 1 min, followed by heating the sample from 120° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C. Samples of polymer are then pressed into a thin film at a temperature of 177° F. About 5 to 8 mg of sample is weighed out and placed in a DSC pan. A lid is crimped on the pan to ensure a closed atmosphere. The sample pan is placed in the DSC cell and then heated at a high rate of about 100° C./min to a temperature of about 30° C. above the polymer melt temperature. The sample is kept at this temperature for 5 minutes. Then the sample is cooled at a rate of 10° C./min to −40° C., and kept isothermally at that temperature for 5 minutes. Consequently the sample is heated at a rate of 10° C./min until melting is complete to generate a $2^{nd}$ heating curve. The heat of fusion is obtained from the $2^{nd}$ heating curves. The % crystallinity for polyethylene resins is calculated using the following equation:

$$\% \text{ Crystallinity} = \frac{\text{Heat of fusion (J/g)}}{292 \text{ J/g}} \times 100\%$$

% Transmittance/Absorbance

The transmission/absorption measurements are performed using a Perkin Elmer Lambda 950 scanning double monochromator, capable of scanning from 180 nm to 3000 nm. The instrument is fitted with a 60 mm integrating sphere accessory, allowing total transmittance measurements. In this mode, the spectrometer can measure all light transmitted as well as all forward scattered light for hazy films or coatings. Light that is not transmitted or forward scattered can be measured as light energy deposited in the film at each wavelength. If the transmittance of the film is low at the wavelength of the laser line, substantial laser energy will be absorbed and converted to heat, and the degree of absorption of the film at each wavelength can be measured. The background was collected by placing no film in the entrance aperture to the integrating sphere. The spectral collection conditions were as follows: 5 nm slits, 1 nm/pt, medium scan speed. The films were cut to a size of 2 inch×2 inch. The films were mounted directly over the entrance port to the integrating sphere and measured in Absorbance units. At least two regions of each film were measured to determine the absorption at pertinent laser wavelengths. Absorbance units (A) are directly mathematically related to Transmittance (T) (also known as "% transmission" or "% Transmittance" with the following formula:

$$A = 2 - \log_{10} \% T$$

EXAMPLES

Films

TABLE 1

Resins Used in Films

| Name | Melt Index (g/10 min) | Density (g/cc) |
| --- | --- | --- |
| AGILITY ™ 2001, commercially available from The Dow Chemical Company (Midland, MI) | 0.40 | 0.925 |
| ELITE ™ AT 6401, commercially available from The Dow Chemical Company (Midland, MI) | 0.85 | 0.912 |
| Dow LDPE 132i, commercially available from The Dow Chemical Company (Midland, MI) | 0.25 | 0.921 |
| Resin A - ethylene-based polymer composition formulated as described in U.S. Pat. No. 8,629,214, Inventive Example 3 | 0.50 | 0.935 |

Film Process

All resins are blown into three layer co-extruded films produced on an Alpine seven layer blown film line and have a film structure as outlined in Table 3. The blown film line consists of seven 50 mm groove fed extruders with moderate-shear barrier screws. The length/diameter (L/D) ratio for the extruders is 30:1. The blown film line uses a 250 mm coex die. The line has a layer distribution of 15/15/13/14/13/15/15 and is equipped with an internal bubble cooling system. The blow up ratio is 2.5, the die gap is 78.7 mil, and the die diameter is 9.84 in. All films are produced at 2.5 mil thickness and have a layflat width of 38.6 in. Additional extruder conditions are shown in Table 2.

TABLE 2

Extruder Conditions

| Extruder # | RPM | Melt Temperature (F.) | Melt Head Pressure (psi) | Layer % |
| --- | --- | --- | --- | --- |
| 1 | 64 | 484 | 5674 | 20 |
| 2 | 34 | 471 | 5005 | 13 |
| 3 | 30 | 474 | 4872 | 11 |
| 4 | 30 | 459 | 4455 | 11 |
| 5 | 30 | 455 | 4376 | 11 |
| 6 | 37 | 475 | 4906 | 14 |
| 7 | 62 | 460 | 5641 | 20 |

Corona Treatment

Corona treatment was applied to the films after the extrusion process using the following conditions: equipment: Enercon single sheet corona treater, power: 1.8 watts× min/ft$^2$, surface treatment: 38-40 dynes.

TABLE 3

| | Skin layer (20 gauge. %) | Core Layer (60 gauge. %) | Skin layer (20 gauge. %) |
|---|---|---|---|
| Inventive Film | 20 wt. % AGILITY ™ 2001, 78 wt. % ELITE ™ AT 6401, 1 wt. % Ingenia-AC-01-01[1], 1 wt. % Ampacet 10063[2] | 60 wt. % LDPE 132i, 40 wt. % Resin A | 20 wt. % AGILITY ™ 2001, 78 wt. % ELITE ™ AT 6401, 1 wt. % Ingenia-AC-01-01, 1 wt. % Ampacet 10063 |

[1]Ingenia AC-01-01 is a polymer processing aid available from Ingenia Polymers.
[2]Ampacet 10063 is an antiblock masterbatch available from Ampacet Corp.

The physical properties of the film is measured and listed below in Table 4.

TABLE 4

Film Properties

| Test Category | Units | Film Properties |
|---|---|---|
| Film Gauge | mil | 2.5 |
| 45° Gloss | degree | 79 |
| Dart Drop Impact Strength | g | 322 |
| 1% Secant Modulus CD | psi | 50446 |
| 1% Secant Modulus MD | psi | 43466 |
| Shrink Tension CD | psi | 0.53 |
| Shrink Tension MD | psi | 17.70 |
| Total (Overall) Haze | % | 3.6 |
| Puncture Resistance | ft-lb/in$^3$ | 88 |
| Elmendorf Tear Strength CD | g | 694 |
| Elmendorf Tear Strength MD | g | 300 |
| Tensile Break Strength CD | psi | 4744 |
| Tensile Break Strength MD | psi | 4586 |
| Tensile Break Elongation CD | % | 645 |
| Tensile Break Elongation MD | % | 459 |

Procedure for Dye Coating Shrink Film

Preparation of dye concentrate—The near IR absorbing dye is either dissolved in methyl ethyl ketone (MEK) or dispersed in MEK for those dyes that are insoluble particles. When dissolving a soluble dye, the dye was simply added to MEK and the solution agitated to fully dissolve. When dispersing a non-soluble dye in MEK, the dye was added to MEK and the dispersion sonicated for approximately 30 min to fully disperse the dye particles.

Preparation of Coating Mixture—Prescribed amounts (as outlined in Table 5) of the (i) dye concentrate prepared as detailed above, (ii) a polyurethane adhesive formulation comprising an isocyanate terminated polyurethane prepolymer and its isocyanate reactive component (ADCOTE™ 1640 and its Coreactant F, both of which are commercially available from The Dow Chemical Company, Midland, Mich.), and (iii) MEK were mixed together to make a coating mixture containing 25 wt % solids. A ratio of 31.25:1, by weight, of ADCOTE™ 1640:Coreactant F, was used in the coating mixture. Where soluble dyes were used, the mixture was agitated gently for 10 minutes to mix all the components, and then used for film coating within 4 hours. Where insoluble dyes were used, the mixture was agitated gently for 10 minutes to mix all the components, and then sonicated for 30 minutes directly before being used to coat films.

TABLE 5

Coating Mixtures

| | Dye | ADCOTE ™ 1640 (g) | Coreactant F (g) | MEK (g) | Amount of Dye (g) |
|---|---|---|---|---|---|
| A | EPOLIGHT ™ 1125 | 11.83 | 0.4 | 7.76 | 0.117 |
| B | EPOLIGHT ™ 1125 | 35.57 | 1.15 | 23.48 | 0.035 |
| C | No Dye | 17.66 | 0.58 | 11.83 | 0.000 |
| D | DLS 983A | 35.38 | 1.14 | 23.46 | 0.035 |
| E | EPOLIGHT ™ 5547 | 17.7 | 0.57 | 11.75 | 0.017 |
| F | EPOLIGHT ™ 5547 | 11.8 | 0.38 | 7.77 | 0.055 |
| G | EPOLIGHT ™ 5547 | 11.79 | 0.38 | 7.74 | 0.110 |
| H | EPOLIGHT ™ 2057 | 11.79 | 0.38 | 7.72 | 0.110 |
| I | DLS 983A | 11.79 | 0.38 | 7.72 | 0.110 |
| J | LUMOGEN ™ IR 1050 | 11.79 | 0.38 | 7.72 | 0.110 |
| K | DT5-13A | 11.79 | 0.38 | 7.72 | 0.110 |
| L | FABULASE ™ 361 | 11.79 | 0.38 | 7.72 | 0.110 |

The EPOLIGHT™ dyes (1125, 2057, 5547) and DT5-13A are available from Epolin, Inc. (Newark, N.J.). DLS 983A and DLS 985A dye are available from Crysta-Lyn Chemical Co. (Binghampton, N.Y.). LUMOGEN™ IR 1050 dye is available from BASF Corp. (Florham Park, N.J.). FABULASE™ 361 is available from Budenheim Inc. (Germany).

Coating the Films—The film samples were cut to size and corona treated on one side then used for coating within 3 hours. The dye-containing coating mixture was deposited onto the top of each film sample on the corona treated side. A number seven wire wrapped draw-down coating bar was placed at the top of the film sample above the bead of coating mixture. To coat the film the draw-down bar was pulled down the film sample in one continuous motion, spreading out the coating mixture evenly over the entire film sample. The MEK solvent was allowed to evaporate from the coated film, and then the coated film was stored at room temperature away from light for 18 h to allow the coating to cure. Additional coating details are outlined in Table 6.

TABLE 6

Dye Coated Shrink Films

| Film No. | Coating Mixture | Coating Weight (lb/ream) | Wt. % Dye in Coating | Dye Coating Weight (lb/ream) | Dye Coating Weight (mg/m$^2$) | Dye Coating Weight (ppm) |
|---|---|---|---|---|---|---|
| 1 | A | 2.06 | 2.27% | 0.04681 | 76.09 | 1331.23 |
| 2 | B | 1.78 | 0.23% | 0.00412 | 6.70 | 117.14 |
| 3 | C | 1.39 | 0.00% | 0.00000 | 0.00 | 0.00 |

TABLE 6-continued

Dye Coated Shrink Films

| Film No. | Coating Mixture | Coating Weight (lb/ream) | Wt. % Dye in Coating | Dye Coating Weight (lb/ream) | Dye Coating Weight (mg/m$^2$) | Dye Coating Weight (ppm) |
|---|---|---|---|---|---|---|
| 4 | D | 1.65 | 0.23% | 0.00383 | 6.23 | 108.97 |
| 5 | E | 1.65 | 0.22% | 0.00364 | 5.92 | 103.63 |
| 6 | F | 1.61 | 1.08% | 0.01746 | 28.38 | 496.62 |
| 7 | G | 1.71 | 2.15% | 0.03677 | 59.77 | 1045.73 |
| 8 | H | 1.61 | 2.15% | 0.03472 | 56.44 | 987.49 |
| 9 | I | 1.58 | 2.14% | 0.03389 | 55.09 | 963.82 |
| 10 | J | 1.60 | 2.14% | 0.03425 | 55.67 | 973.99 |
| 11 | K | 1.58 | 2.14% | 0.03396 | 55.20 | 965.85 |
| 12 | L | 1.59 | 2.14% | 0.03418 | 55.55 | 971.95 |

The dye-coated shrink films were then measured for radiation absorption at various wavelengths. Referring to FIG. 1, the radiation absorption was measured and depicted for dye-coated shrink films 5, 6, and 7. Film 3 is coated with a formulation not containing any dye. As depicted, film 3 shows virtually no radiation absorption (and the level of absorption is not significant for the purposes described herein), while films 5, 6, and 7 showing increase absorption levels that are dependent upon the amount of dye present in the coating. Also as depicted, films 5, 6, and 7 show that dye-coated films can be very transparent or colorless in the visible region (roughly the 400 nm to 700 nm) of the spectrum due to the narrow absorption of the dye in the NIR region. Thus, the films may be highly NIR absorbing, but may appear colorless to the eye. Referring to FIG. 2, the radiation absorption was measured and depicted at a wavelength of 930 nm when coated side of dye-coated shrink films 3, 5, 6, and 7 was facing towards the light source and when the uncoated side of dye-coated shrink films 3, 5, 6, and 7 was facing towards the light source. As depicted and shown below in Table 7, the radiation absorption did not vary much depending upon whether the coated or uncoated side of the films were facing towards the light source.

TABLE 7

Radiation Absorption at 930 nm

| Film No. | Dye Concentration (ppm) | Absorption at 930 nm (Coated Side Towards Light Source) (Au$^3$) | Absorption at 930 nm (Uncoated Side Towards Light Source) (Au) |
|---|---|---|---|
| 3 | 0 | 0 | 0 |
| 5 | 103.63 | 0.076 | 0.077 |
| 6 | 496.62 | 0.45 | 0.45 |
| 7 | 1045.73 | 0.79 | 0.88 |

$^3$Au = absorbance units

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A shrink film comprising:
   a polyethylene-based film having a top surface, a bottom surface, and comprising one or more layers, wherein at least one layer of the polyethylene-based film comprises:
   a low density polyethylene having a density of from 0.917 g/cc to 0.935 g/cc and melt index, I2, of from 0.1 g/10 min to 5 g/10 min, a linear low density polyethylene having a density of from 0.900 g/cc to 0.965 g/cc and melt index, I2, of from 0.05 g/10 min to 15 g/10 min, or combinations thereof, and
   optionally, a medium density polyethylene, a high density polyethylene, or combinations thereof; and
   a coating layer disposed on the top surface of the polyethylene-based film, wherein the coating layer comprises an adhesive and a near-infrared absorbent material having the structure (I):

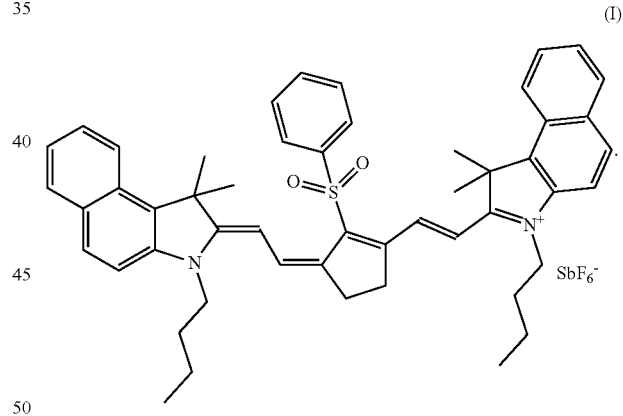

(I)

2. The shrink film of claim 1, wherein the top surface of the polyethylene-based film is corona-treated.

3. The shrink film of claim 1, wherein the coating layer comprises from 0.01 wt. % to 30 wt. % of the near-infrared absorbing material.

4. The shrink film of claim 1, wherein the near-infrared absorbing material absorbs radiation at wavelengths of from 700 nm to 3000 nm.

5. The shrink film of claim 1, wherein the polyethylene-based film is a multilayer film comprising a core layer and at least one outer layer.

6. The shrink film of claim 5, where the polyethylene-based film further comprises an intermediate layer positioned between the core layer and the at least one outer layer, wherein the intermediate layer comprises an ethylene-based polymer.

7. The shrink film of claim 1, wherein the at least one layer of the polyethylene-based film comprises from 5 to 100 wt. %, based on the total polymer weight present in the composition, of the low density polyethylene.

8. The shrink film of claim 1, wherein the at least one layer of the polyethylene-based film comprises from 5 to 100 wt. %, based on the total polymer weight present in the composition, of the linear low density polyethylene.

\* \* \* \* \*